(12) United States Patent
Kim et al.

(10) Patent No.: US 12,538,904 B2
(45) Date of Patent: Feb. 3, 2026

(54) DWARFISM ANIMAL MODEL HAVING IGF-1 GENETIC MUTATION AND METHOD FOR PRODUCING SAME

(71) Applicant: KOREA RESEARCH INSTITUTE OF BIOSCIENCE AND BIOTECHNOLOGY, Daejeon (KR)

(72) Inventors: Sun Uk Kim, Daejeon (KR); Young Ho Park, Daejeon (KR); Kyu Tae Chang, Daejeon (KR); Bo Woong Sim, Daejeon (KR); Bong Seok Song, Daejeon (KR); Hae Jun Yang, Daejeon (KR); Sang Rae Lee, Daejeon (KR); Kang Jin Jeong, Daejeon (KR); Pil Soo Jeong, Daejeon (KR); Yeung Bae Jin, Daejeon (KR); Phil Yong Kang, Daejeon (KR); Seung Hwan Lee, Daejeon (KR); Hwal Yong Lee, Daejeon (KR); Kyung Seob Lim, Daejeon (KR); Young Hyun Kim, Daejeon (KR); Ji Su Kim, Daejeon (KR); Han Na Kim, Daejeon (KR); Hee Chang Son, Daejeon (KR); Seung Bin Yoon, Daejeon (KR); Jong Hee Lee, Daejeon (KR); Seon A Choi, Daejeon (KR); Jae Won Huh, Daejeon (KR)

(73) Assignee: KOREA RESEARCH INSTITUTE OF BIOSCIENCE AND BIOTECHNOLOGY, Daejeon (KR)

( * ) Notice: Subject to any disclaimer, the term of this patent is extended or adjusted under 35 U.S.C. 154(b) by 1249 days.

(21) Appl. No.: 17/288,045

(22) PCT Filed: Oct. 23, 2019

(86) PCT No.: PCT/KR2019/013971
§ 371 (c)(1),
(2) Date: Apr. 23, 2021

(87) PCT Pub. No.: WO2020/085788
PCT Pub. Date: Apr. 30, 2020

(65) Prior Publication Data
US 2021/0392863 A1 Dec. 23, 2021

(30) Foreign Application Priority Data
Oct. 24, 2018 (KR) .......................... 10-2018-0127655

(51) Int. Cl.
*A01K 67/0276* (2024.01)
*C12N 9/22* (2006.01)
*C12N 15/11* (2006.01)
*C12N 15/85* (2006.01)

(52) U.S. Cl.
CPC ............ *A01K 67/0276* (2013.01); *C12N 9/22* (2013.01); *C12N 15/11* (2013.01); *C12N 15/8509* (2013.01); *A01K 2217/075* (2013.01); *A01K 2227/108* (2013.01); *A01K 2267/0306* (2013.01); *C12N 2015/8536* (2013.01); *C12N 2310/20* (2017.05); *C12N 2800/80* (2013.01)

(58) Field of Classification Search
CPC .......... A01K 67/0276; A01K 2217/075; A01K 2227/108; A01K 2267/0306; C12N 9/22; C12N 15/11; C12N 15/8509; C12N 2015/8536; C12N 2310/20; C12N 2800/80
See application file for complete search history.

(56) References Cited

FOREIGN PATENT DOCUMENTS

| KR | 10-2009-0051716 | 5/2009 |
|---|---|---|
| KR | 10-2018-0091291 | 8/2018 |
| WO | 01-72119 | 10/2001 |

OTHER PUBLICATIONS

Walenkamp et al. Homozygous and Heterozygous Expression of a Novel Insulin-Like Growth Factor-I Mutation. J Clin Endocrinol Metab. Mar. 15, 2005; 90(5):2855-2864. (Year: 2005).*
Schalkwyk et al. Interpretation of knockout experiments: the congenic footprint. Genes Brain Behav. Apr. 1, 2007; 6(3):299-303 (Year: 2007).*
Antonell et al. Partial 7q11.23 deletions further implicate GTF2I and GTF2IRD1 as the main genes responsible for the Williams-Beuren syndrome neurocognitive profile. J Med Genet. May 2010; 47(5):312-320 (Year: 2010).*
Ulrich. "Improving Cloning Efficiency". Harvard Medical School News and Research; Nov. 6, 2014. Retrieved from the Internet https://hms.harvard.edu/news/improving-cloning-efficiency (Year: 2014).*
Cui et al. Generation of a miniature pig disease model for human Laron syndrome. Sci Rep. Oct. 29, 2015; 5:15603; referenced as p. 1-11 (Year: 2015).*

(Continued)

*Primary Examiner* — Peter Paras, Jr.
*Assistant Examiner* — Gillian C. Reglas
(74) *Attorney, Agent, or Firm* — LEX IP MEISTER, PLLC

(57) ABSTRACT

The present disclosure relates to a dwarfism animal model carrying an IGF-1 gene mutation and a method for generating the same. According to the present disclosure, the problem that an animal dies immediately after birth is overcome, the majority of phenotypes seen in Laron syndrome patients may be observed in the dwarfism animal model, and the dwarfism animal model has decreased expression of personality genes. Thus, the dwarfism animal model may be effectively used as a dwarfism-related disease model.

2 Claims, 26 Drawing Sheets

Specification includes a Sequence Listing.

(56) References Cited

OTHER PUBLICATIONS

Matoba et al Somatic Cell Nuclear Transfer Reprogramming: Mechanisms and Applications. Cell Stem Cell, Jul. 19, 2018; 23(4):471-485; referenced as p. 1-33 (Year: 2018).*

Perisse et al. Improvements in Gene Editing Technology Boost Its Applications in Livestock. Front Genet. 2021;11:1-21. Published Jan. 8, 2021 (Year: 2021).*

Inoue Mouse somatic cell nuclear transfer: What has changed and remained unchanged in 25 years. J Reprod Dev. Mar. 13, 2023; 69(3): 129-138 (Year: 2023).*

Olivo-Marston SE,et al. Genetic reduction of circulating insulin-like growth factor-1 inhibits azoxymethane-induced colon tumorigenesis in mice. Mol Carcinog. Dec. 2009;48(12):1071-6. doi: 10.1002/mc.20577. (Year: 2009).*

HaoJie Hu et al., "Intrathecal Injection of scAAV9-hIGF1 Prolongs the Survival of ALS Model Mice by Inhibiting the NF-kB Pathway", Neuroscience. Jun. 15, 2018;381:1-10. doi: 10.1016/j.neuroscience.2018.02.004. Epub Feb. 12, 2018.

Jeh-Ping Liu et al., "Mice carrying null mutations of the genes encoding insulin-like growth factor I (Igf-1) and type 1 IGF receptor (Igf1r)", Cell. Oct. 8, 1993;75(1):59-72.

I Castilla-Cortazar et al., "An experimental model of partial insulin-like growth factor-1 deficiency in mice", J Physiol Biochem. Mar. 2014;70(1):129-39. doi: 10.1007/s13105-013-0287-y. Epub Sep. 18, 2013.

Candice G. T. Tahimic et al., "Anabolic effects of IGF-1 signaling on the skeleton", Front. Endocrinol., vol. 4, Article 6, Feb. 4, 2013, https://doi.org/10.3389/fendo.2013.00006.

Carolin Perleberg et al., "Genetically engineered pigs as models for human disease", Dis Model Mech. Jan. 22, 2018;11(1):dmm030783. doi: 10.1242/dmm.030783.

Yunyun Cheng et al., "Porcine IGF1 synonymous mutation alter gene expression and protein binding affinity with IGF1R", International Journal of Biological Macromolecules, vol. 116, Sep. 2018, pp. 23-30.

Darlene E Berryman et al., "Role of the GH/IGF-1 axis in lifespan and healthspan: lessons from animal models", Growth Horm IGF Res. Dec. 2008;18(6):455-71. doi: 10.1016/j.ghir.2008.05.005. Epub Aug. 16, 2008.

EPO, Search Report of EP 19876636.2 dated Jul. 1, 2022.

Christy S. Carter et al., "Models of Growth Hormone and IGF-1 Deficiency: Applications to Studies of Aging Processes and Life-Span Determination", Journal of Gerontology: Biological Sciences, 2002, vol. 57A, No. 5, B177-B188.

HuiQian Lin et al., "Intramuscular Delivery of scAAV9-hIGF1 Prolongs Survival in the hSOD1 G93A ALS Mouse Model via Upregulation of D-Amino Acid Oxidase", Mol Neurobiol 55, 682-695, Dec. 19, 2016. https://doi.org/10.1007/s12035-016-0335-z.

Juan E Puche et al., "Human conditions of insulin-like growth factor-I (IGF-I) deficiency", J Transl Med 10, 224, Nov. 14, 2012. https://doi.org/10.1186/1479-5876-10-224.

E. A. Nikitina et al., "Williams Syndrome As a Model for Elucidation of the Pathway Genes—the Brain—Cognitive Functions: Genetics and Epigenetics", Acta Naturae. 2014, vol. 6, No. 1, p. 9-22.

Michael B. Ranke et al., "Treatment of Dwarfism With Recombinant Human Insulin-Like Growth Factor-1", Dtsch Arztebl Int. Oct. 2009; 106(43):703-9. doi: 10.3238/arztebl.2009.0703.

HuiQian Lin et al., "Intramuscular Delivery of scAAV9-hIGF1 Prolongs Survival in the hSOD1G93A ALS Mouse Model via Upregulation of D-Amino Acid Oxidase," Molecular Neurobiology, vol. 55, No. 1, pp. 682-695, Dec. 2016, doi: https://doi.org/10.1007/s12035-016-0335-z.

Christy S Carter et al., "Models of Growth Hormone and IGF-1 Deficiency: Applications to Studies of Aging Processes and Life-Span Determination," The Journals of Gerontology Series A: Biological Sciences and Medical Sciences, vol. 57, No. 5, pp. B177-B188, May 2002, doi: https://doi.org/10.1093/gerona/57.5.b177.

Carolin Perleberg et al., "Genetically engineered pigs as models for human disease," Disease Models & Mechanisms, vol. 11, 2018, doi: https://doi.org/10.1242/dmm.030783.

Genome editing handbook, the third edition, Cosmo Bio Co., Ltd., Nov. 2017.

JPO, Office Action of JP 2021-522083 dated Sep. 20, 2022.

\* cited by examiner

【Fig. 1】
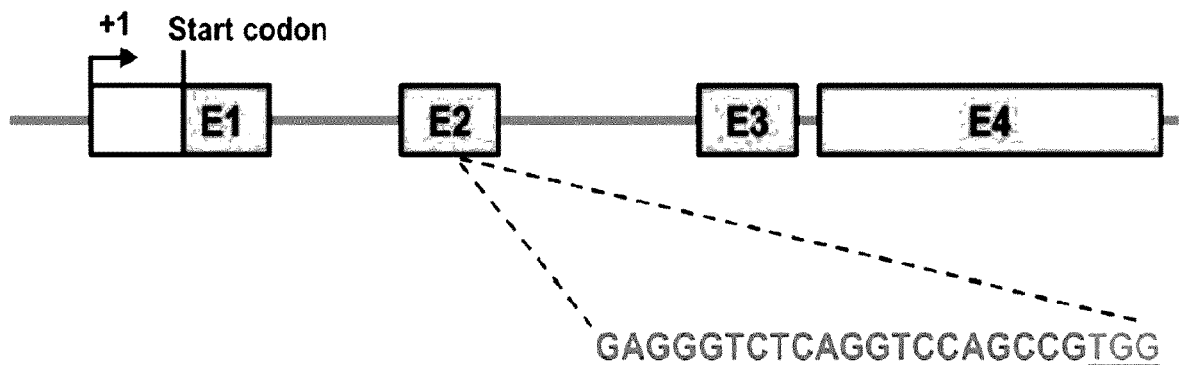
【Fig. 2】
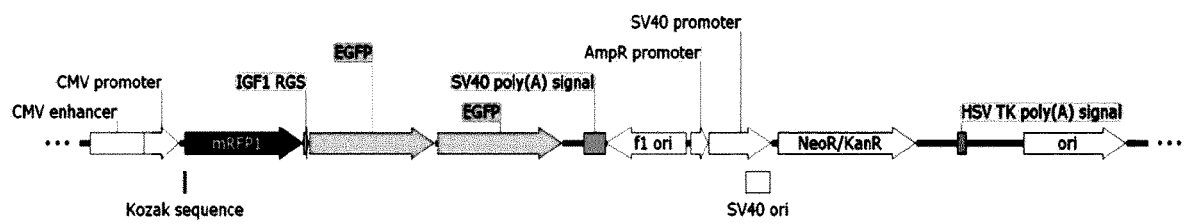
【Fig. 3】
【Fig. 4】
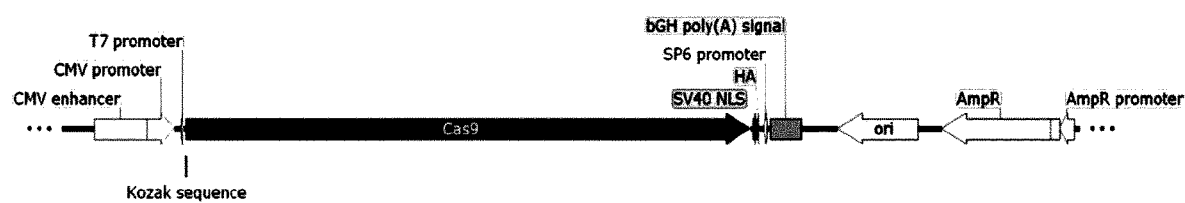

[Fig. 5]
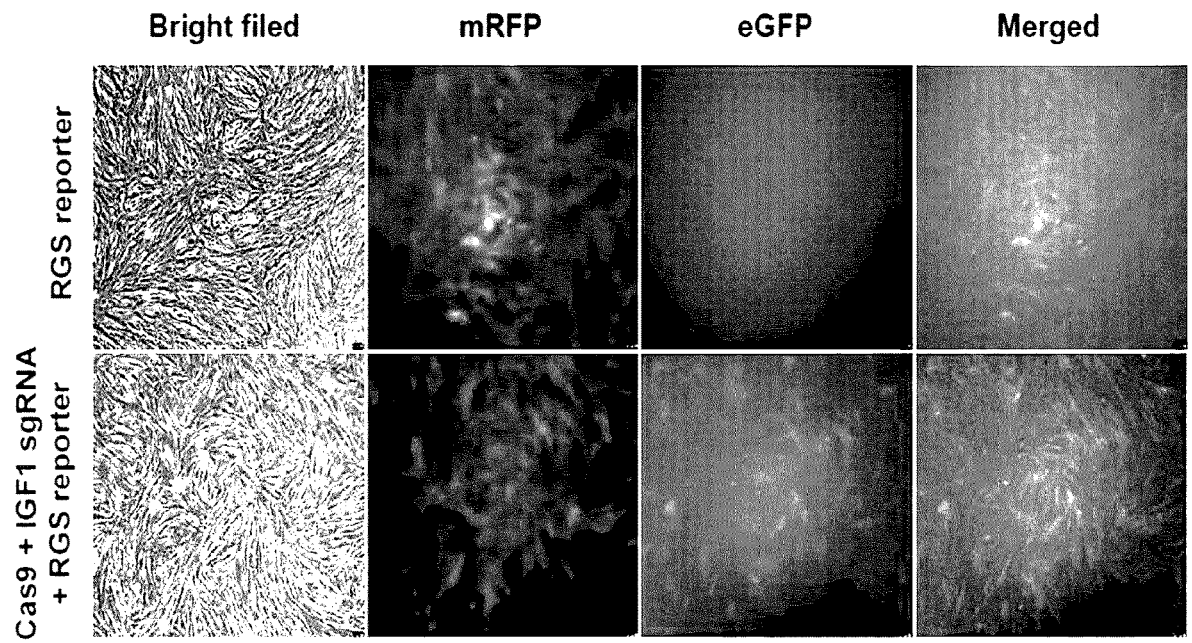
[Fig. 6]
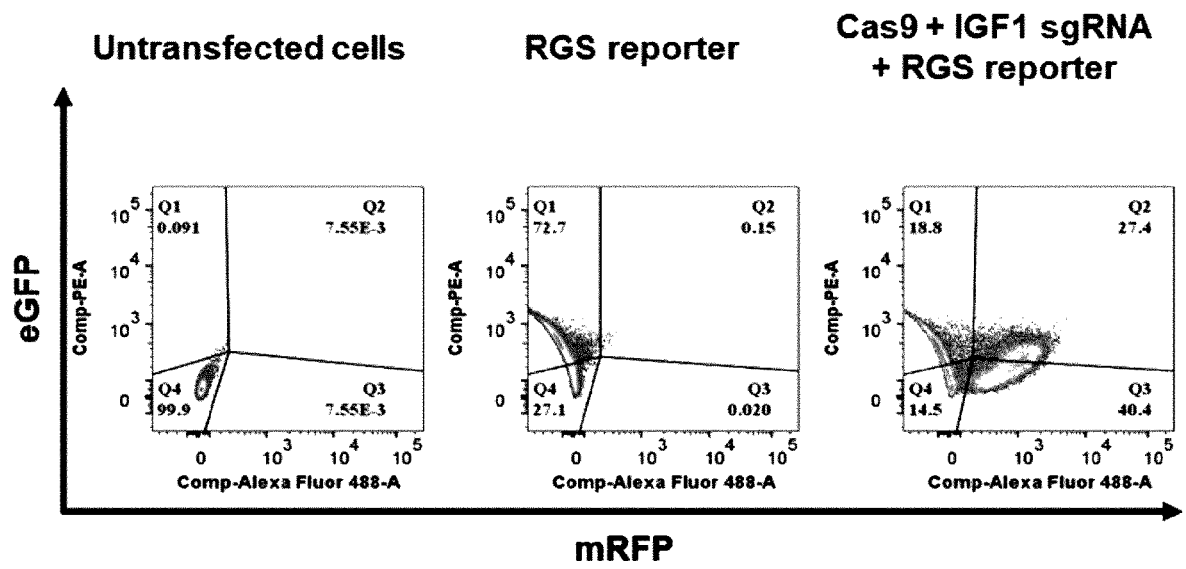

【Fig. 7】
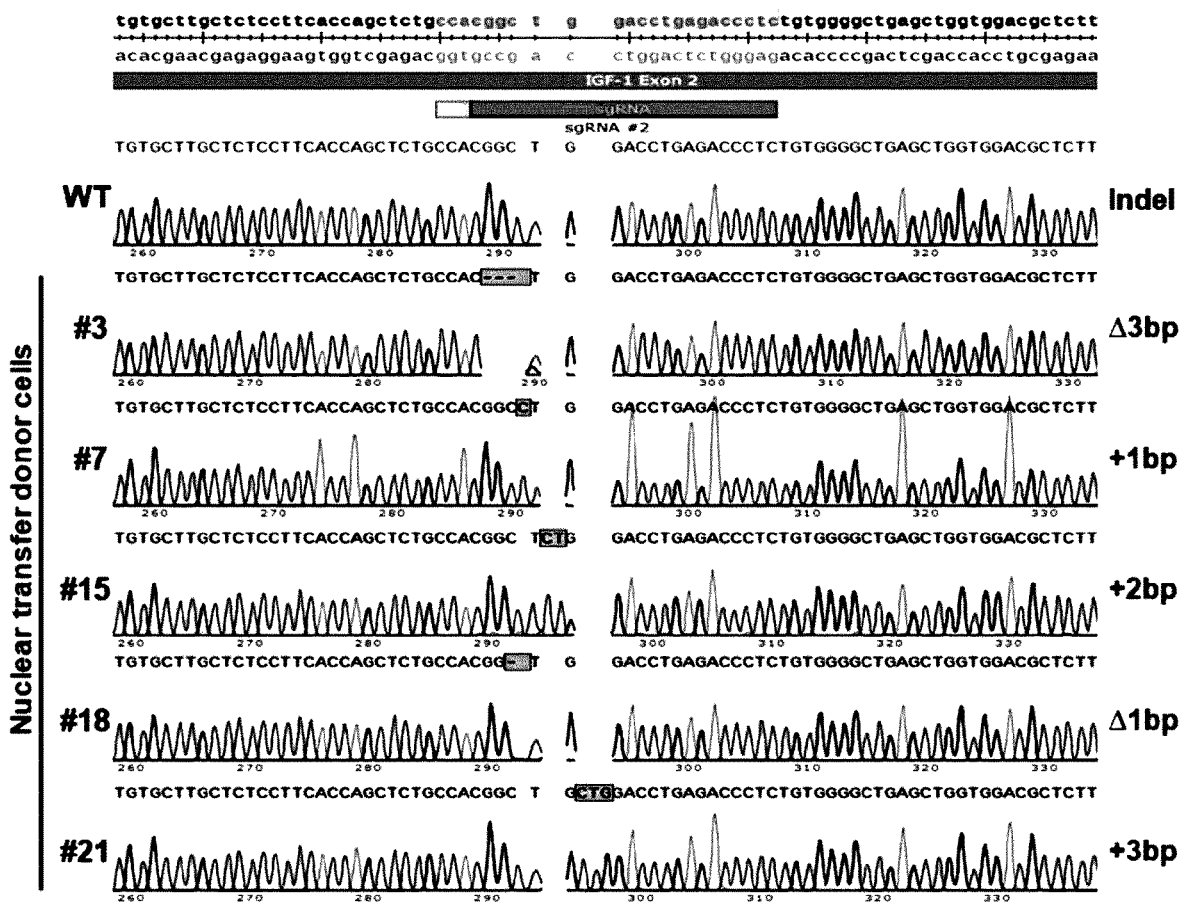
【Fig. 8】
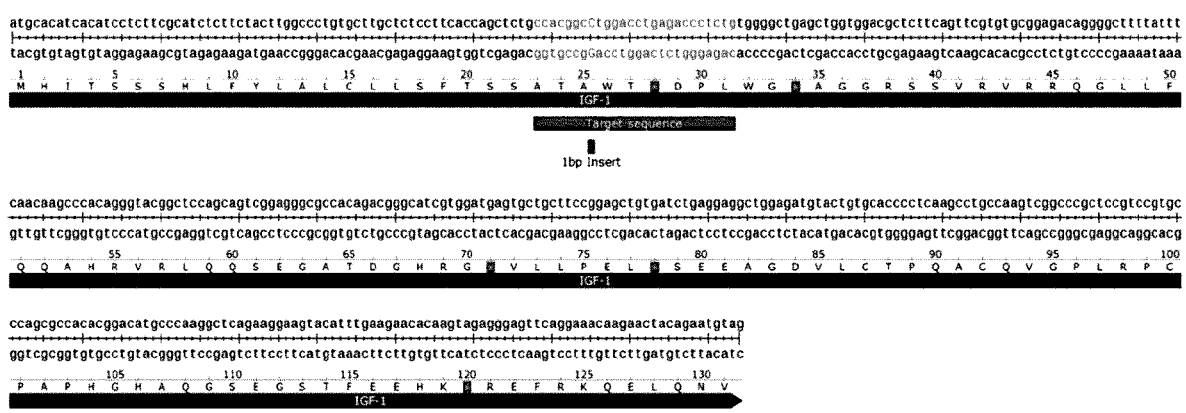

[Fig. 9]

[Fig. 10]

[Fig. 11]
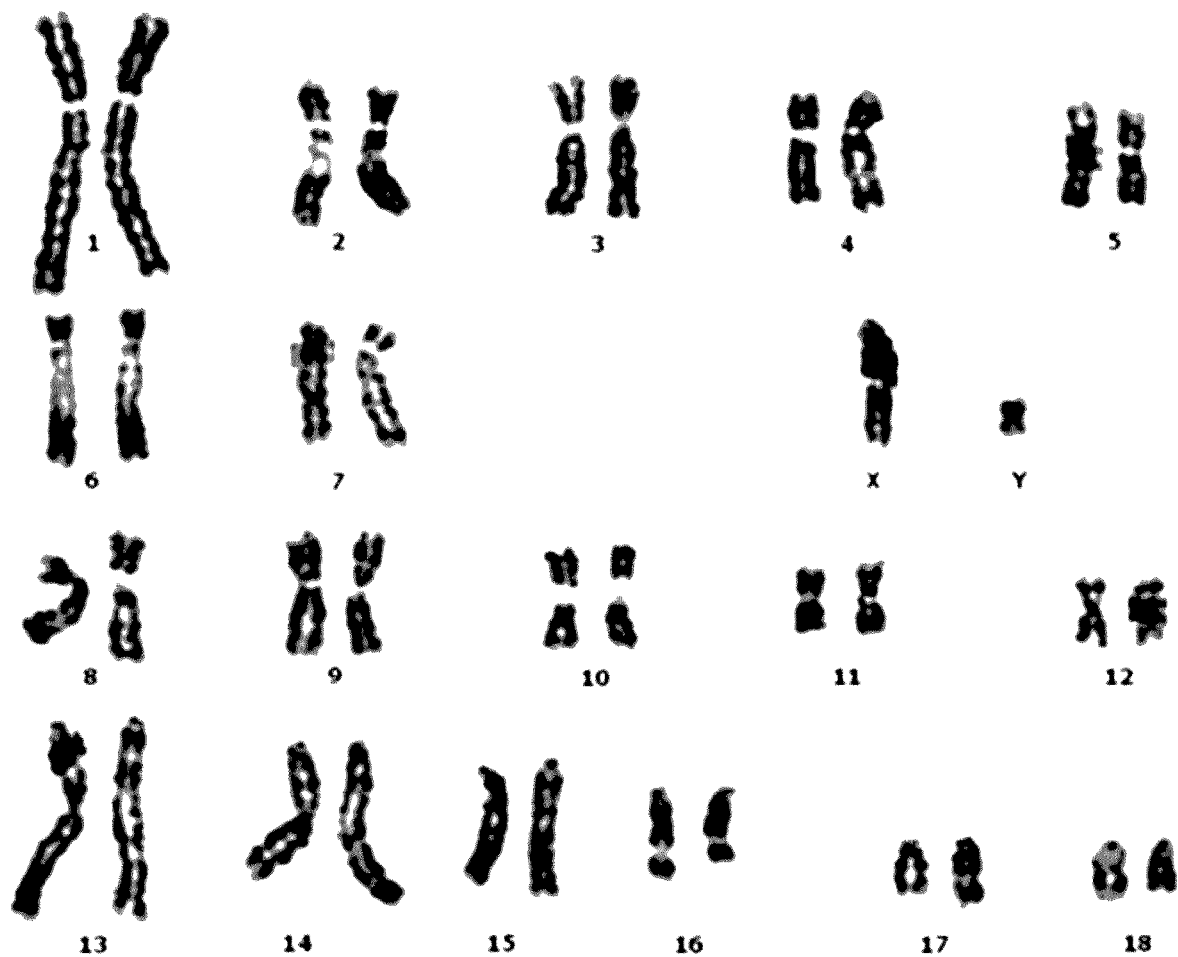

【Fig. 12】
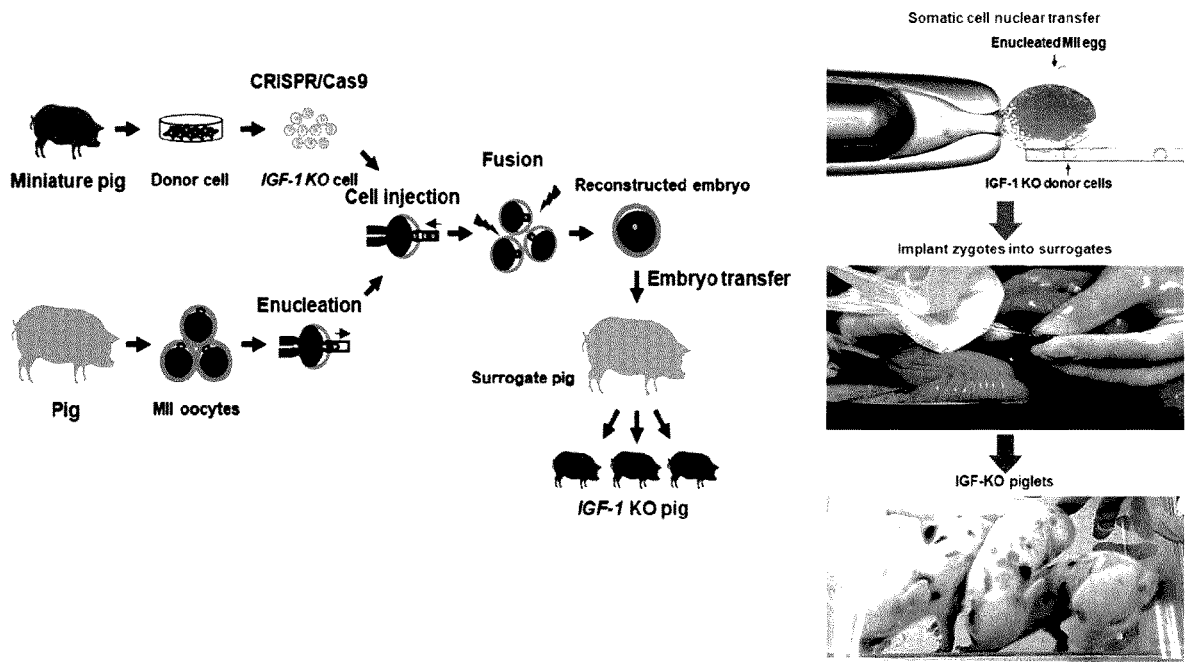
【Fig. 13】
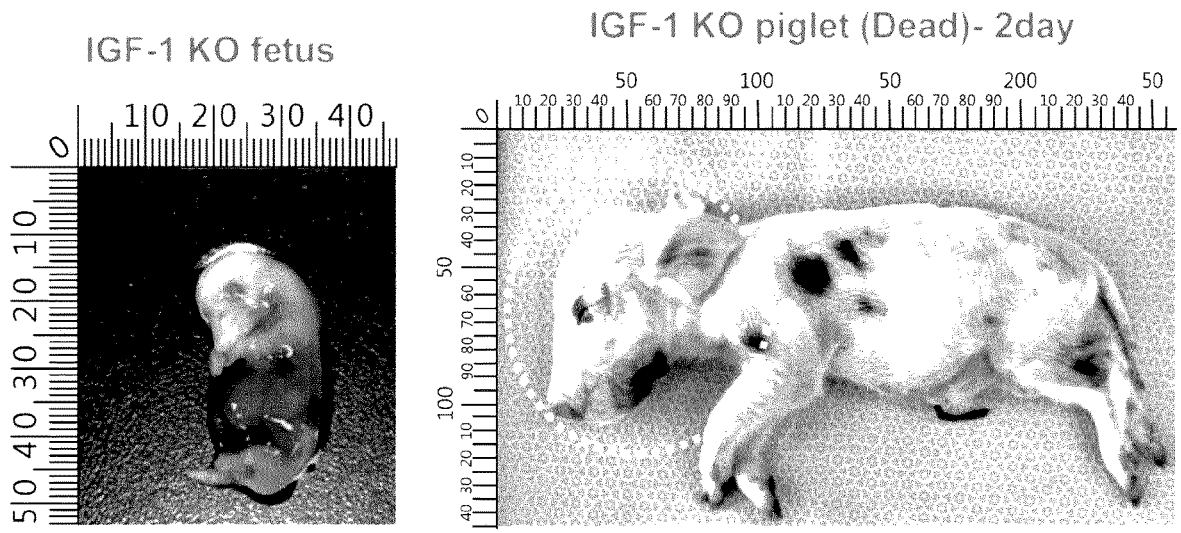

[Fig. 14]
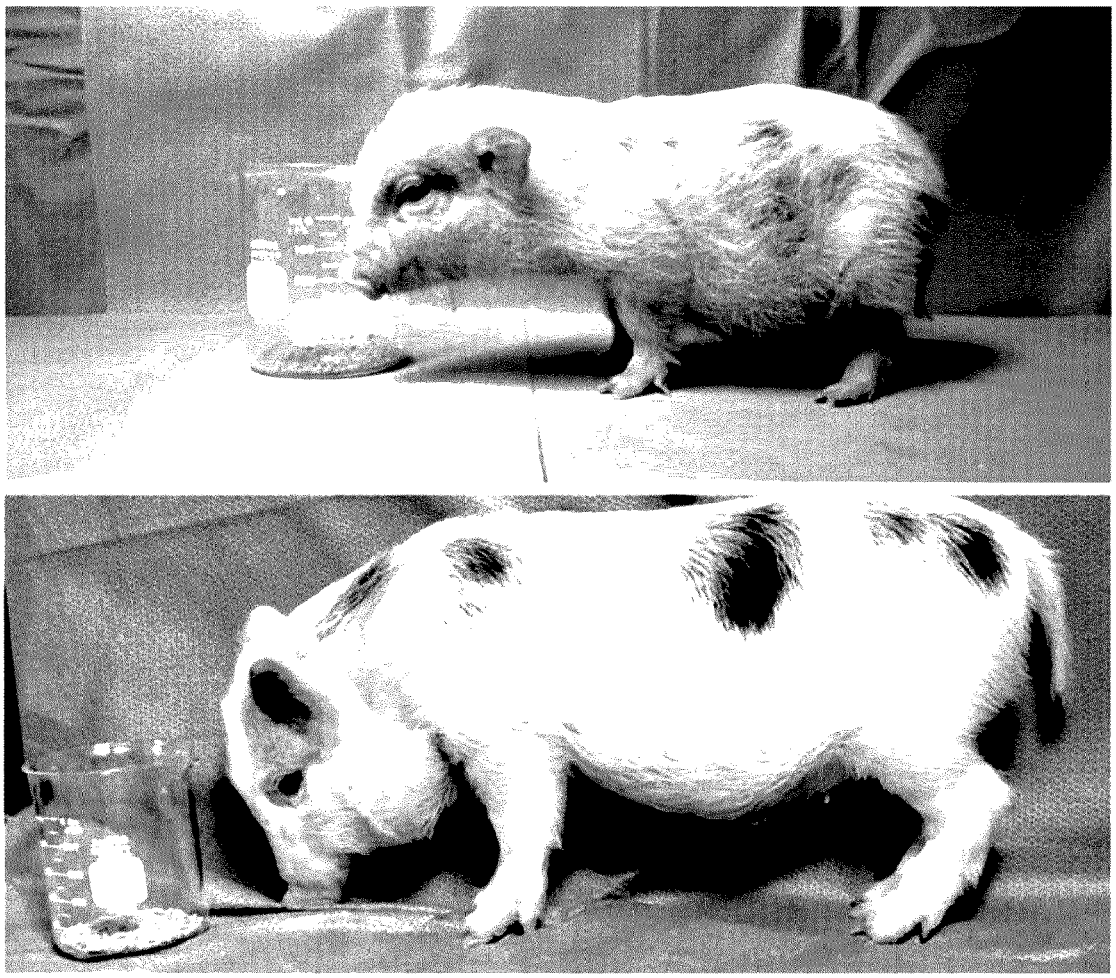

[Fig. 15]
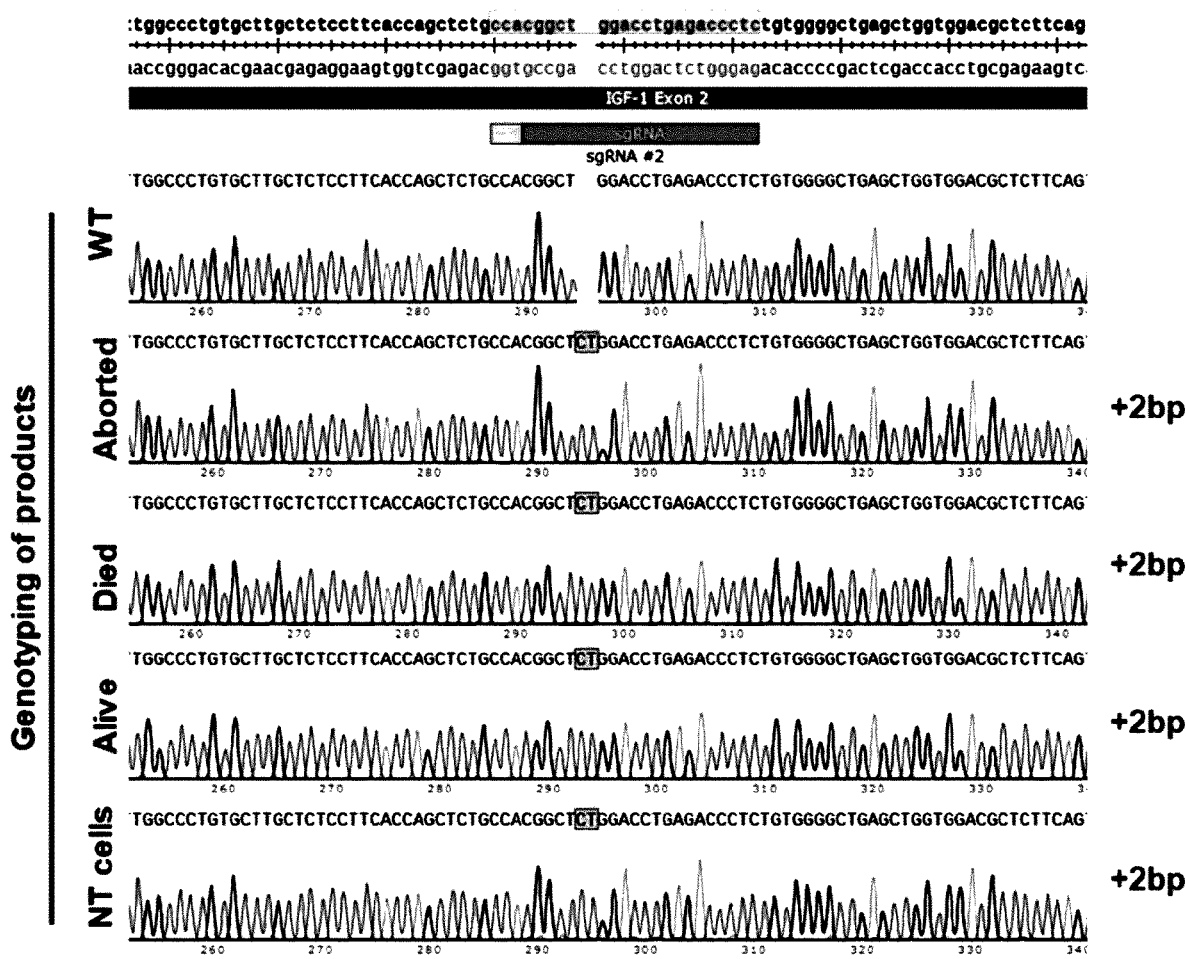

[Fig. 16]

A   + = forward; - = reverse; MM = mismatches; E = exonic; I = intronic; - = intergenic

| Coordinates | strand | MM | target_seq | PAM | distance | | gene name | gene id |
|---|---|---|---|---|---|---|---|---|
| chr5:85705393-85705415 | - | 0 | GAGGGTCT[CAGGTCCAGCCG] | TGG | 0 | E | IGF1 | ENSSSCG00000000857 |
| chr13:89664580-89664602 | + | 3 | GATGGTCT[GAGGTGCAGCCG] | TGG | 34145 | - | SLC25A36 | ENSSSCG00000011669 |
| GL895253-2:16599-16621 | + | 3 | GATGGTCT[GAGGTGCAGCCG] | TGG | NA | - | NA | NA |
| chr2:18736790-18736812 | - | 3 | GCGGGGCT[CAGGTCCTGCCG] | GGG | 24248 | - | PRDM11 | ENSSSCG00000013276 |
| chr18:55820142-55820164 | - | 3 | GAGGGTGT[CAGCTGCAGCCG] | TGG | 32 | I | | ENSSSCG00000028116 |
| chr9:135473033-135473055 | + | 3 | GAAGGACT[CAGGTCCAGCTG] | TGG | 4513 | - | CACNA1E | ENSSSCG00000015543 |
| chr15:71917413-71917435 | + | 3 | CAGGGTCT[CAGGCCCAGCTG] | GGG | 55204 | - | U6 | ENSSSCG00000026166 |
| chr7:39372554-39372576 | + | 3 | GTGGGTCT[CAGGACCAGCTG] | TGG | 344 | I | DNAH8 | ENSSSCG00000001588 |
| chr6:86837183-86837205 | - | 3 | GAGGGACT[CAGGCCCAGCTG] | GGG | 21233 | - | | ENSSSCG00000003647 |
| chr9:48093576-48093598 | - | 3 | GAGGGTGT[CAGGGCCAGCTG] | GGG | NA | - | NA | NA |
| chr12:40935077-40935099 | + | 3 | GAGGCTCT[CAGGTCGAGCAG] | TGG | 18081 | - | | ENSSSCG00000029123 |
| chr6:58395760-58395782 | - | 3 | GAGGGGCT[CAGGACCAGCCC] | GGG | 626 | I | PRKCZ | ENSSSCG00000030361 |
| GL893516-1:65690-65712 | + | 3 | GAGGGTCC[CAGGCCCAGCCC] | AGG | NA | - | NA | NA |
| chr12:51528932-51528954 | + | 3 | GAGAGTCT[CAGGTCCACCCC] | TGG | 89 | I | TRPV3 | ENSSSCG00000017862 |

B

SLC25A36
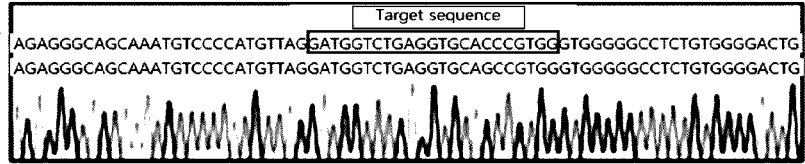

CACNA1E
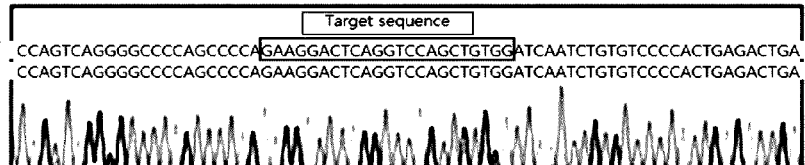

DNAH8
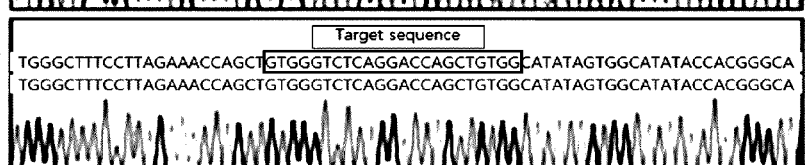

TRPV3
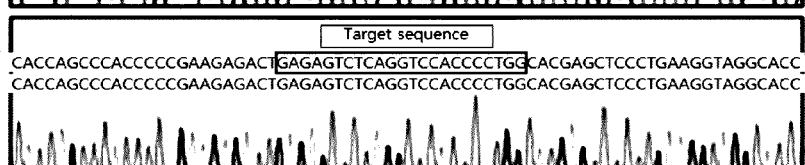

PRDM11
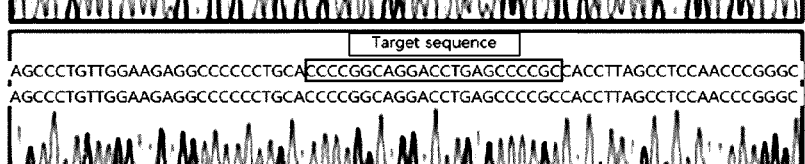

U6
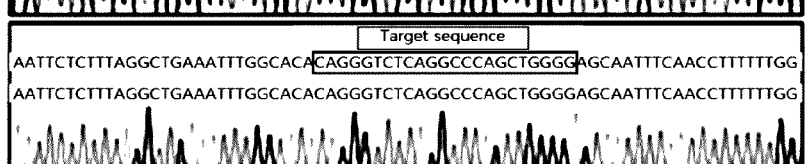

PRKCZ
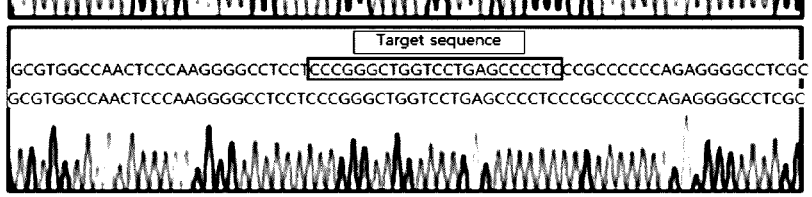

[Fig. 17]
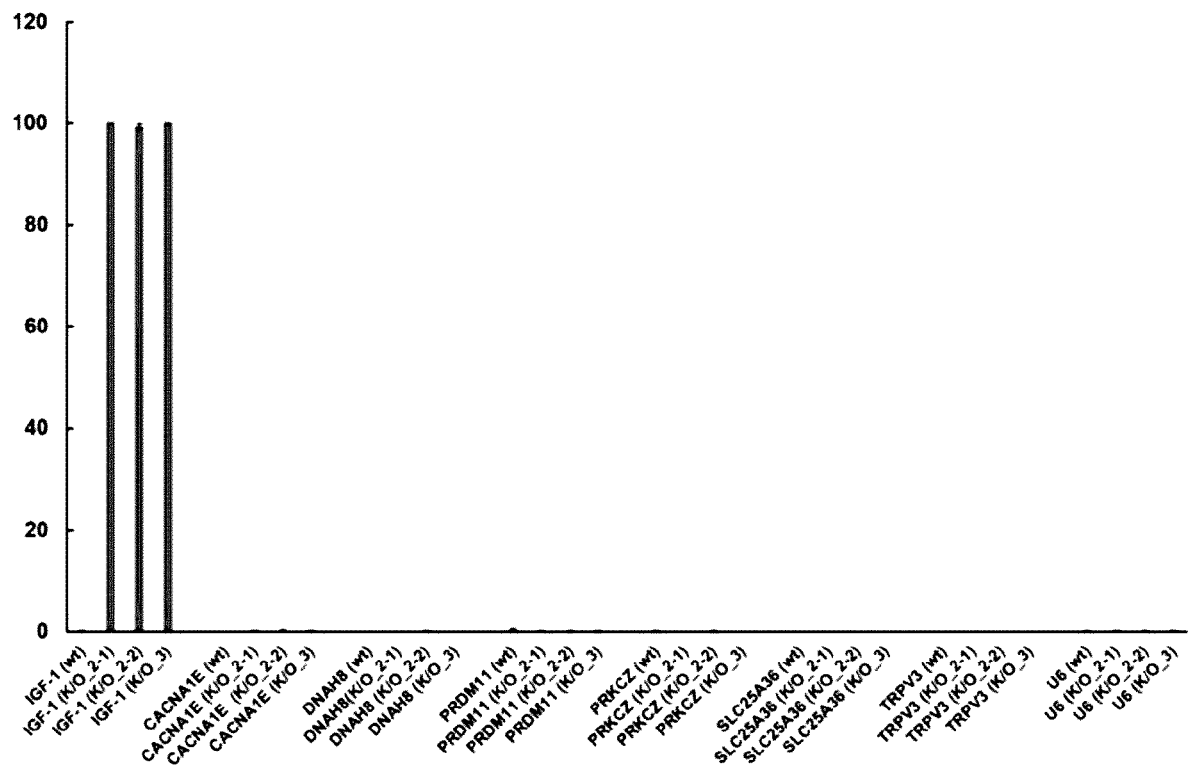

[Fig. 18]
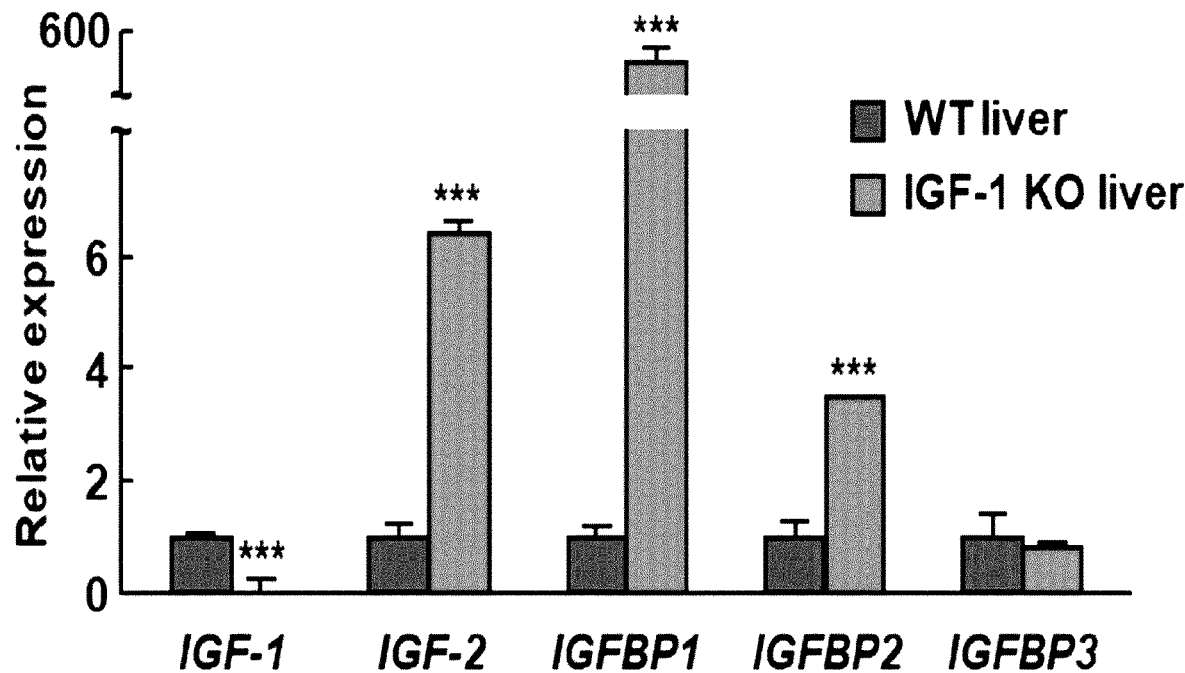
[Fig. 19]
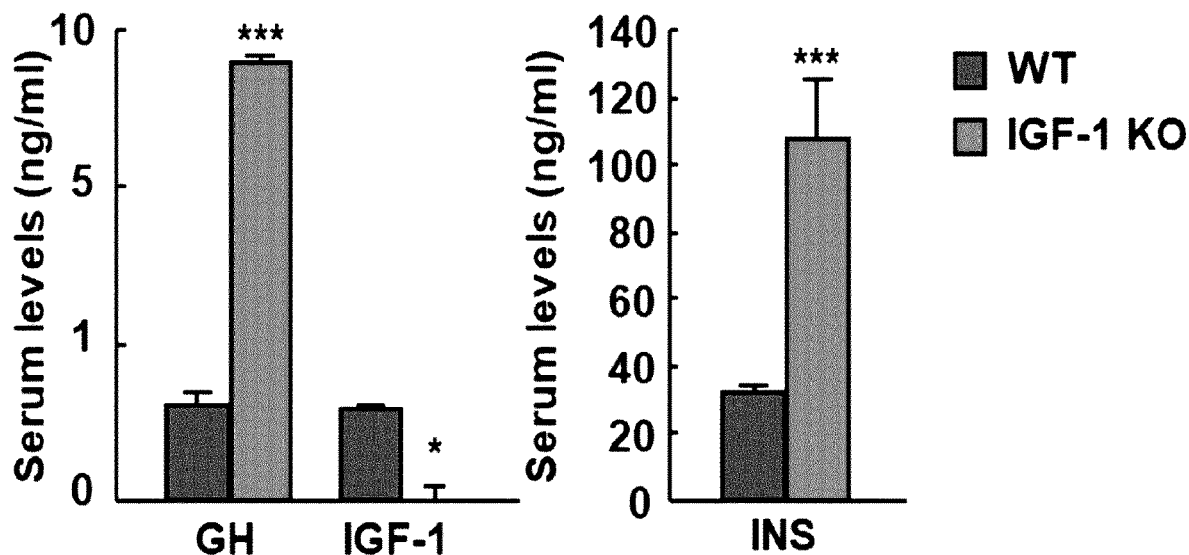

[Fig. 20]
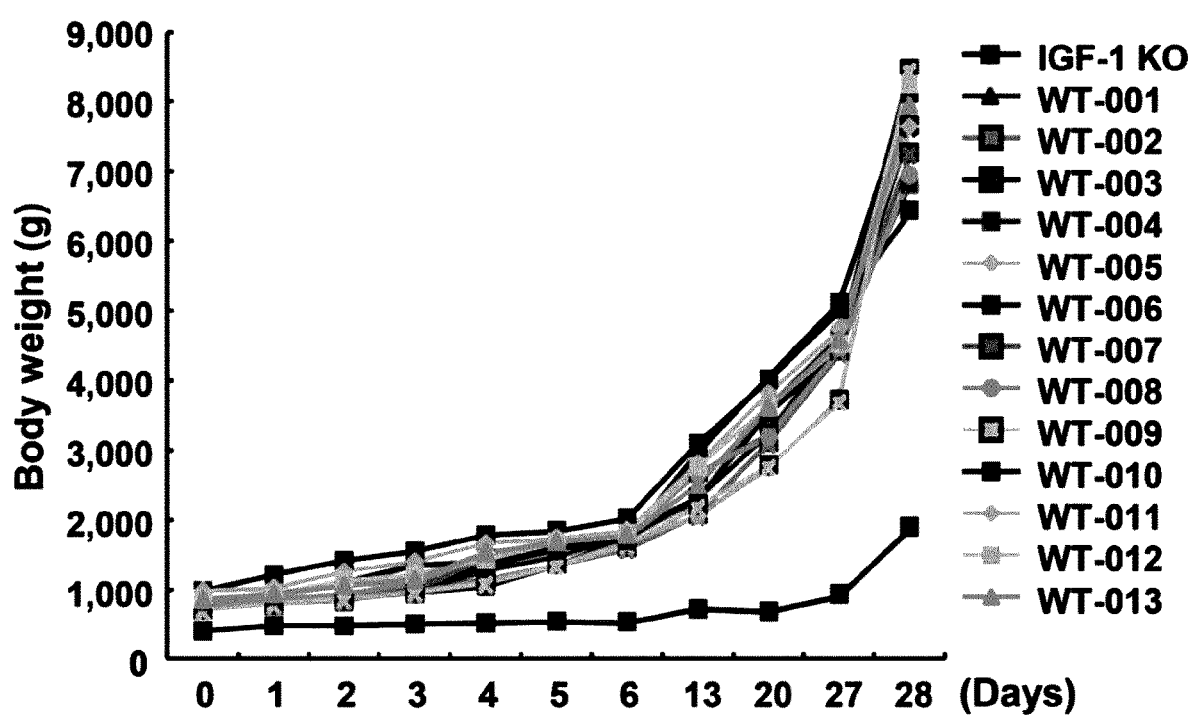

[Fig. 21]
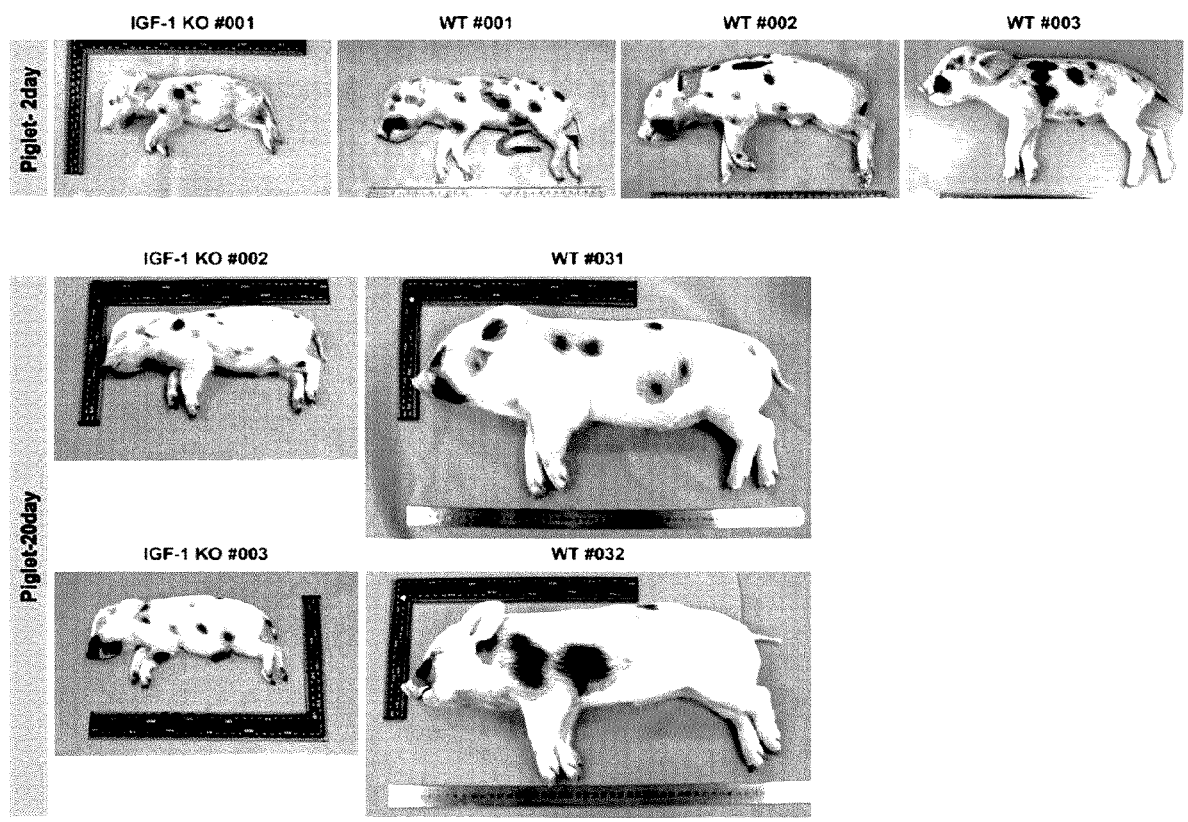

[Fig. 22]
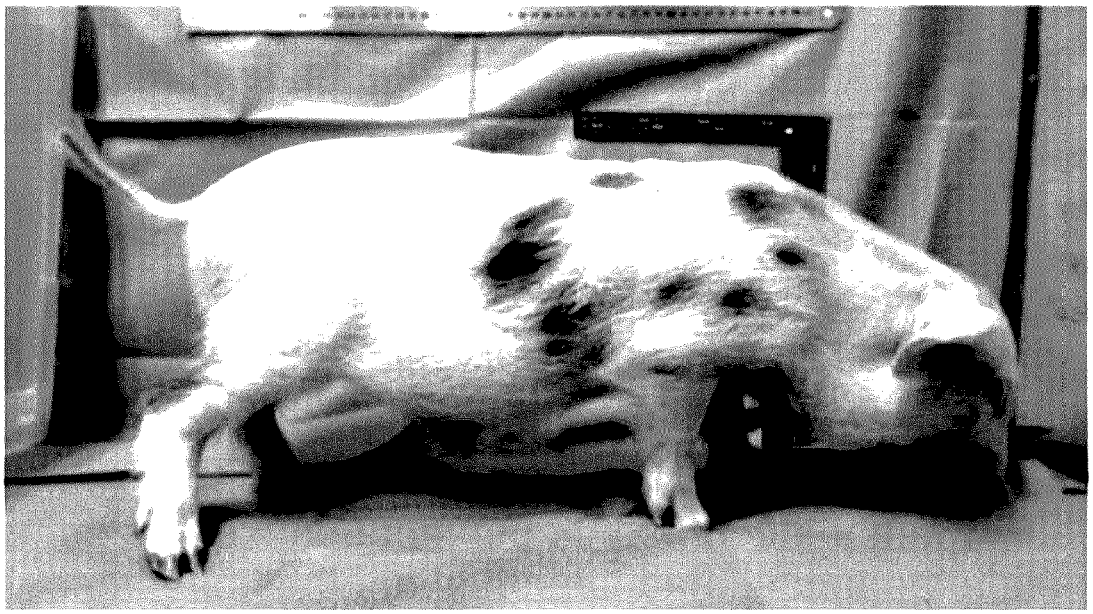

[Fig. 23]
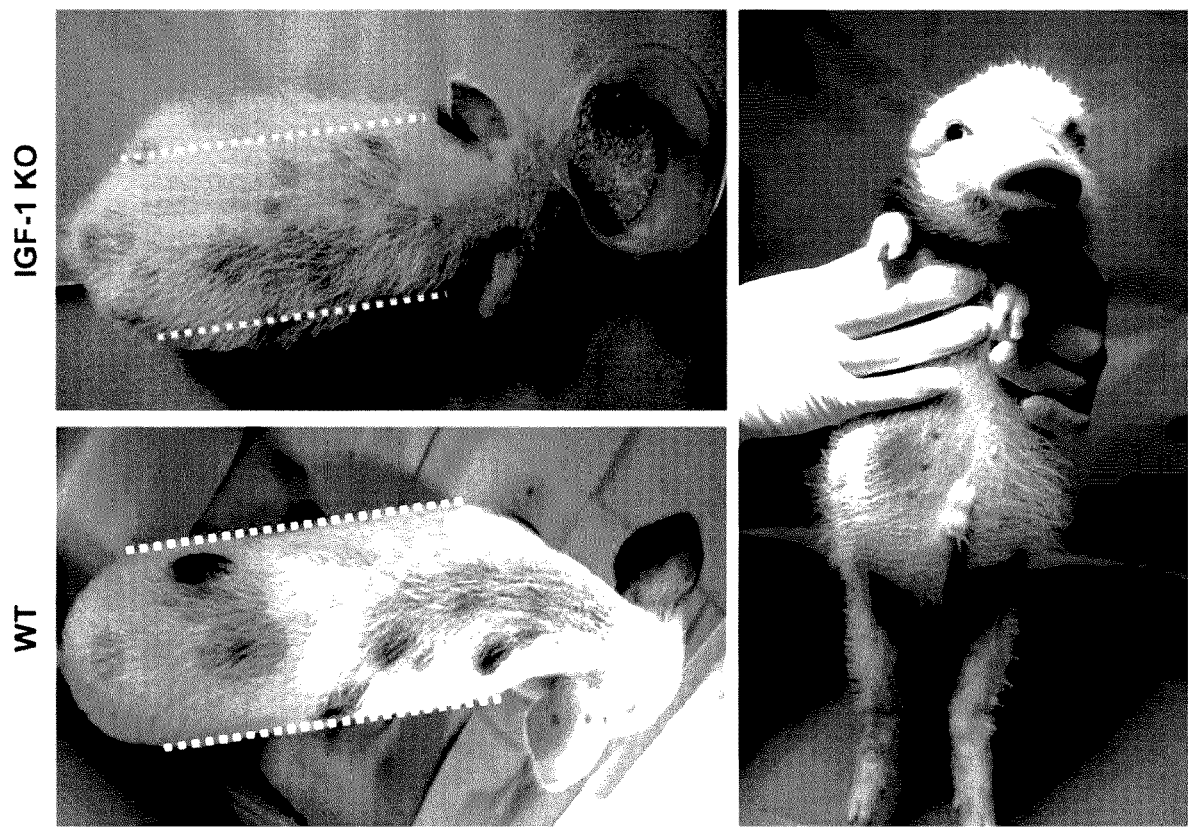

[Fig. 24]
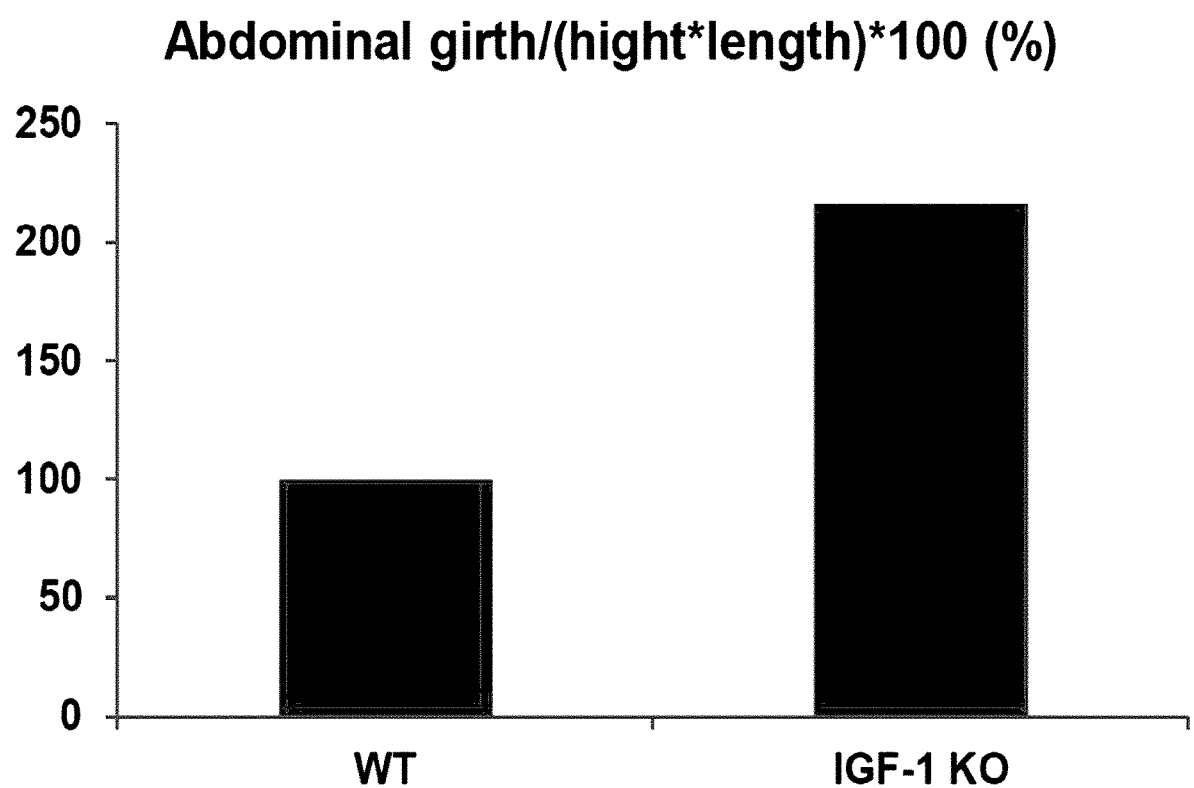

[Fig. 25]
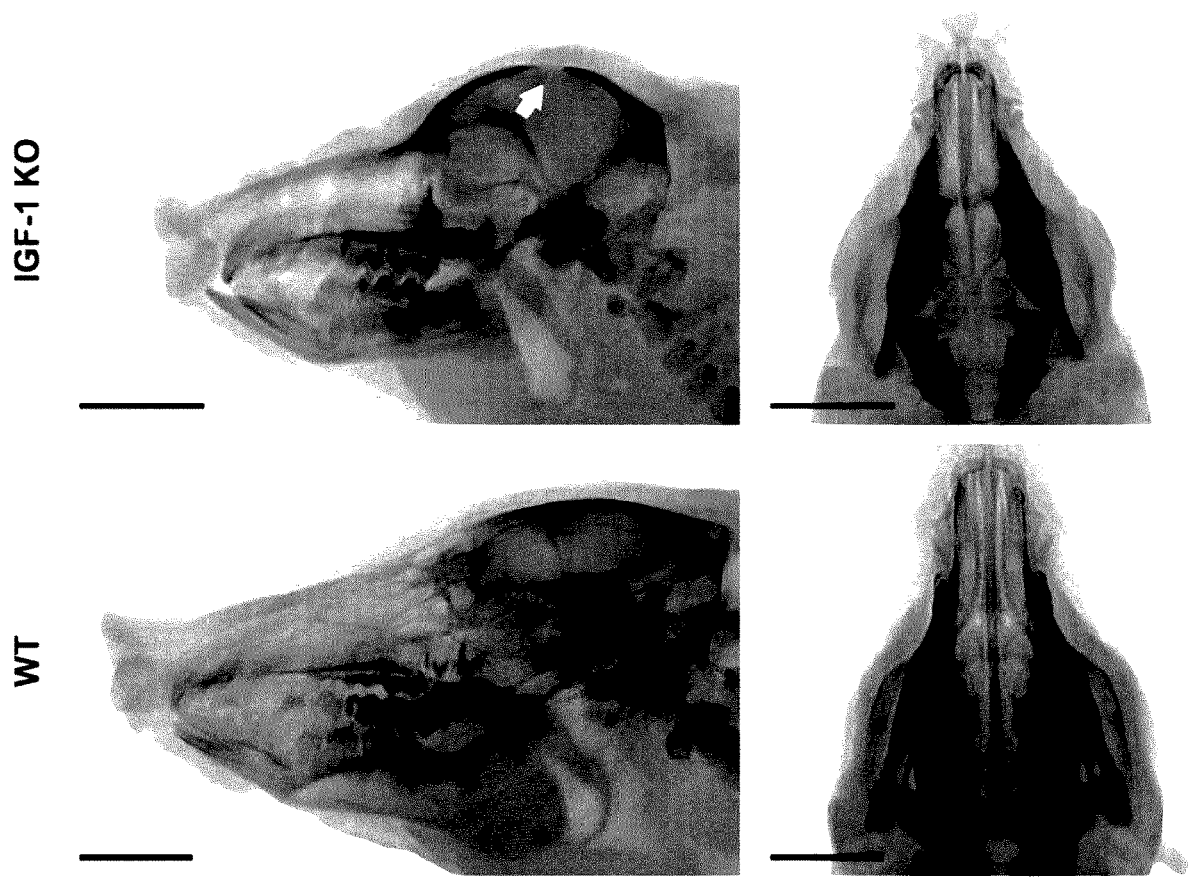

[Fig. 26]
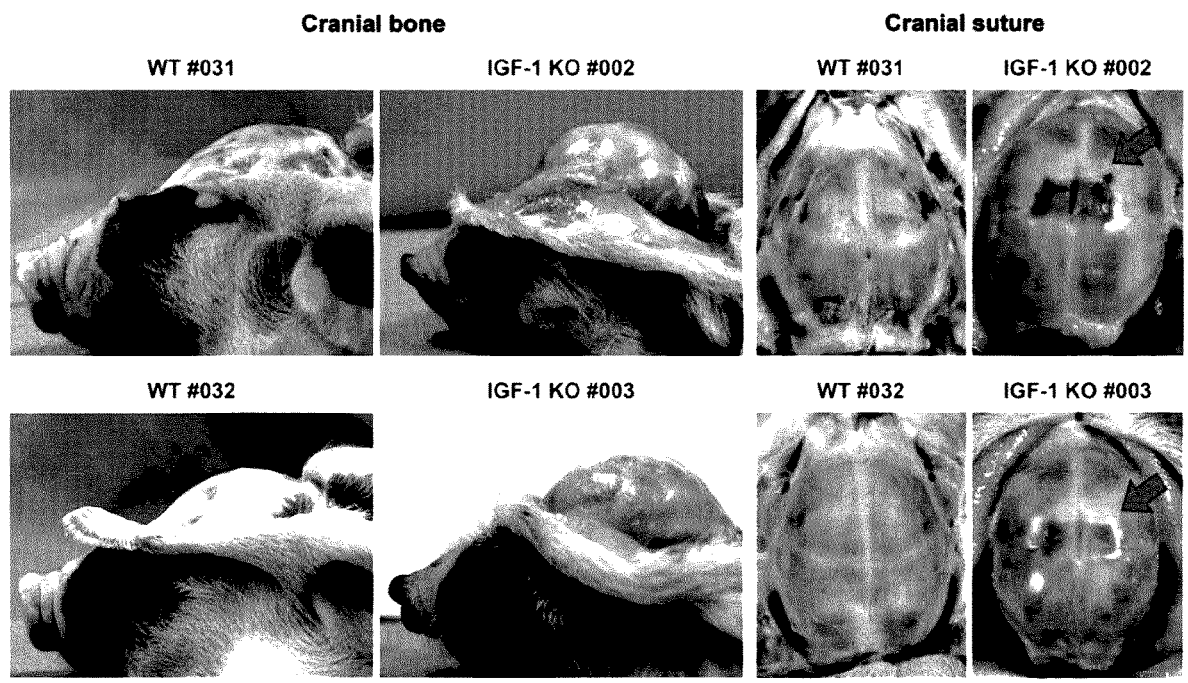

[Fig. 27]
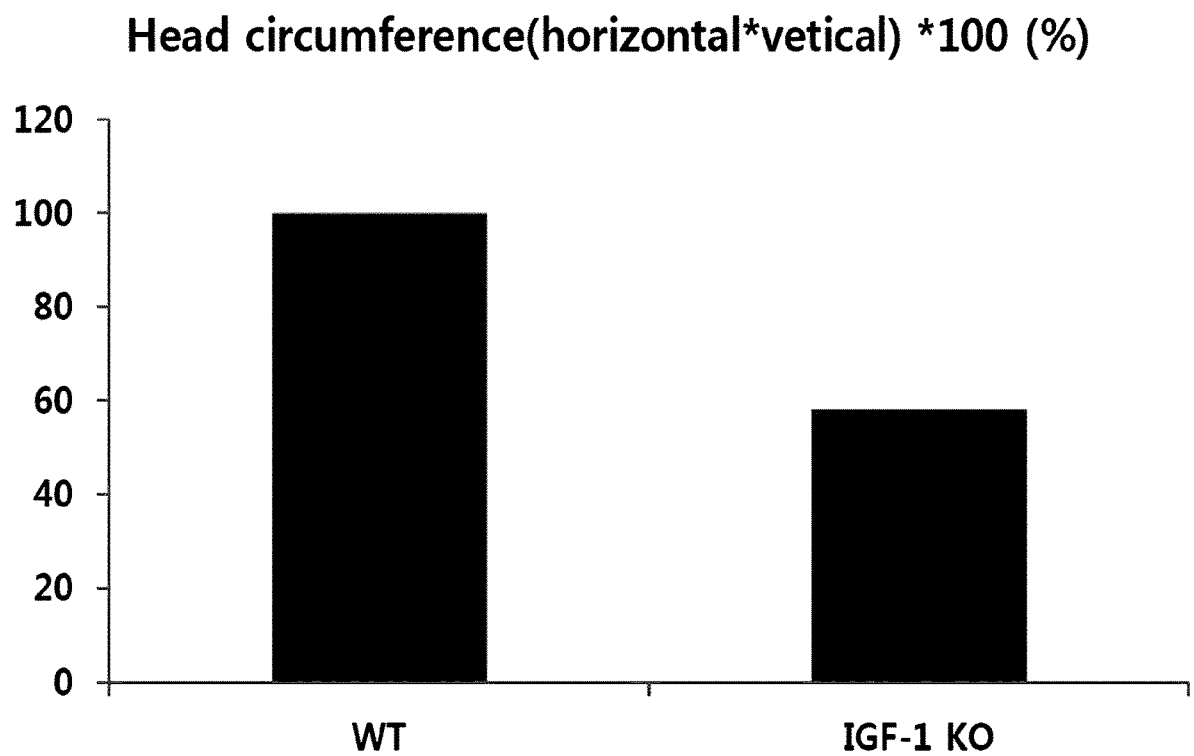

【Fig. 28】
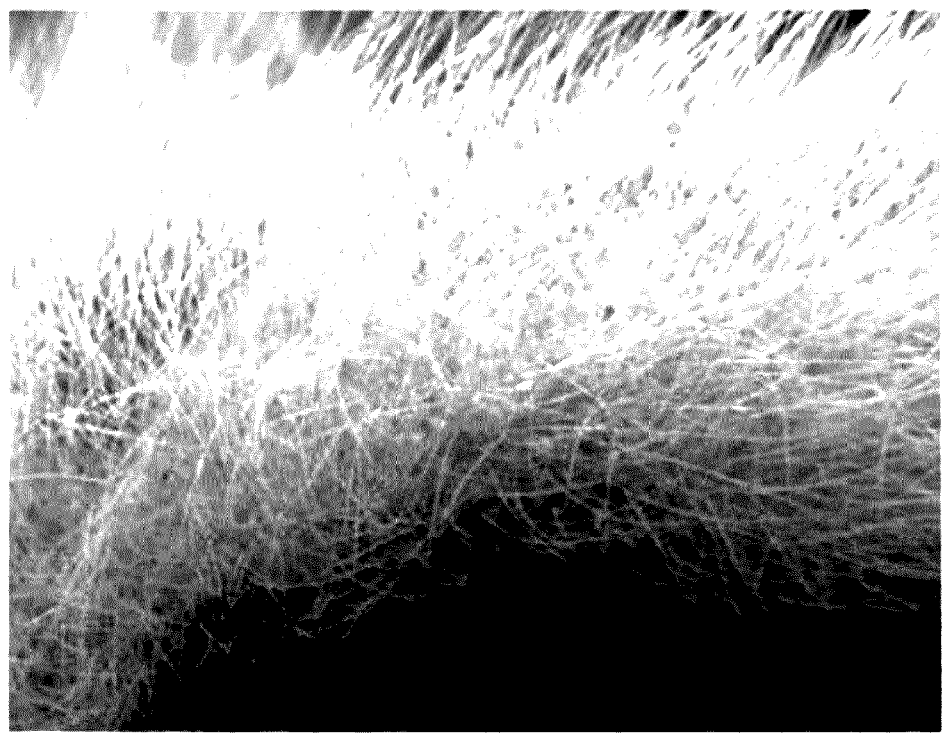
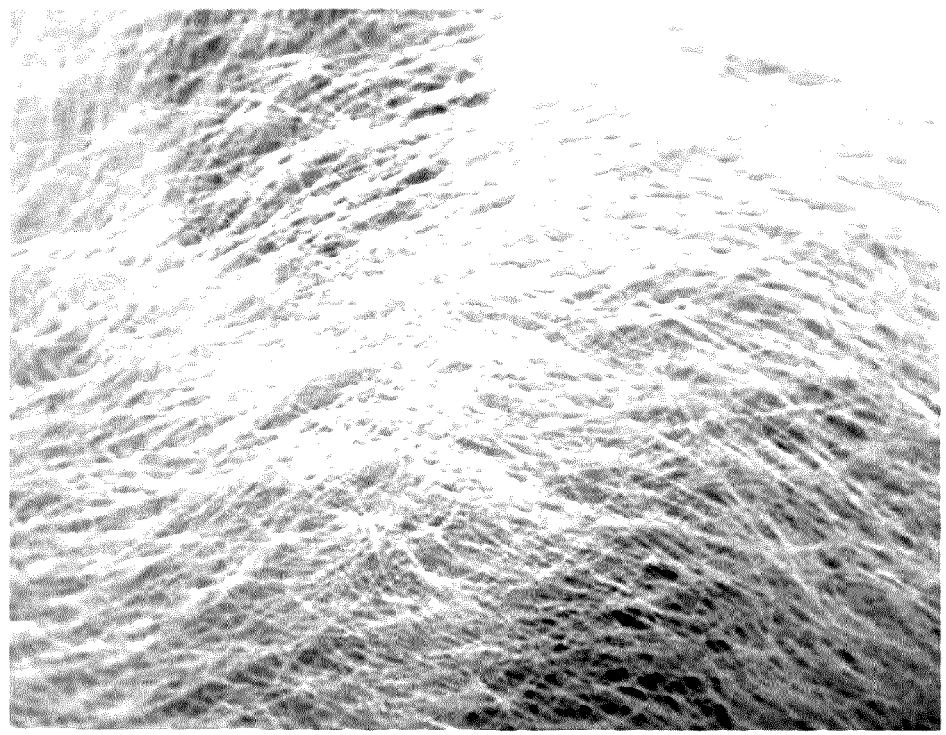

[Fig. 29]
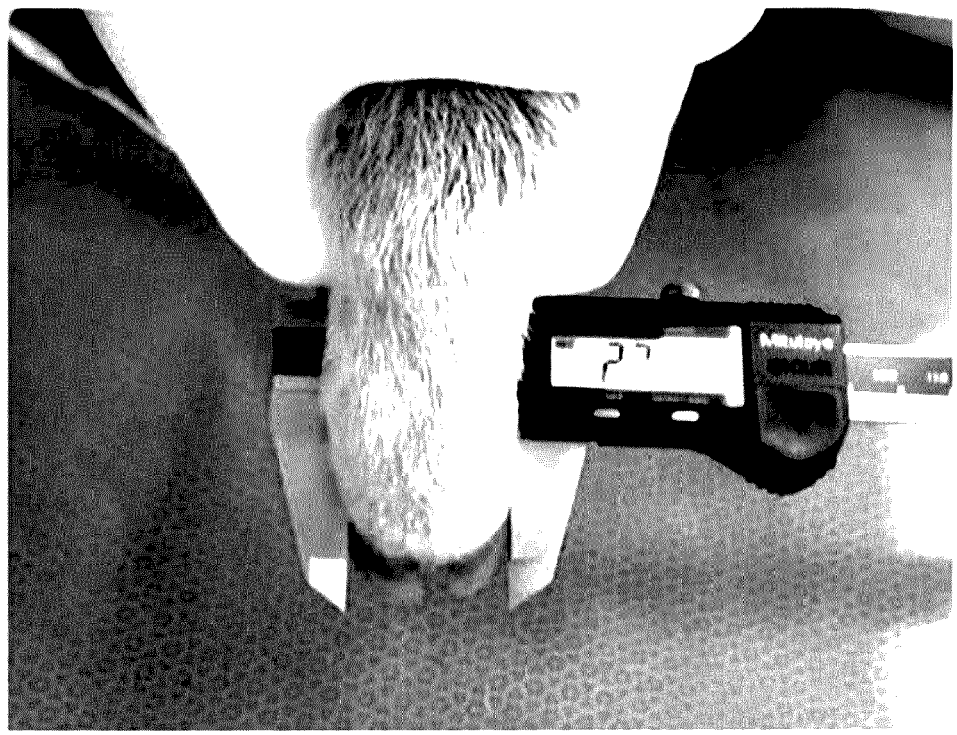
IGF-1 KO
WT

[Fig. 30]
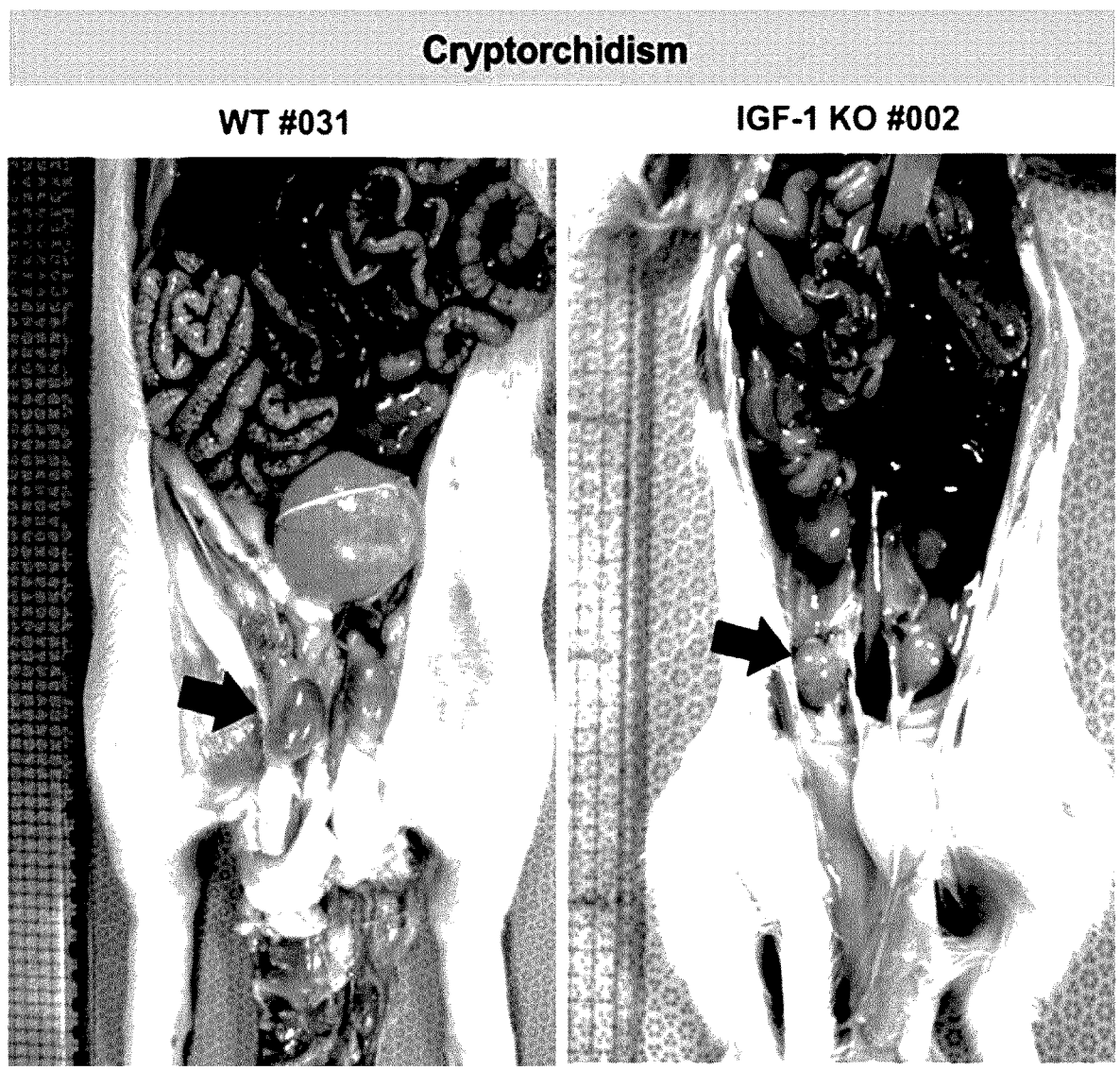

[Fig. 31]
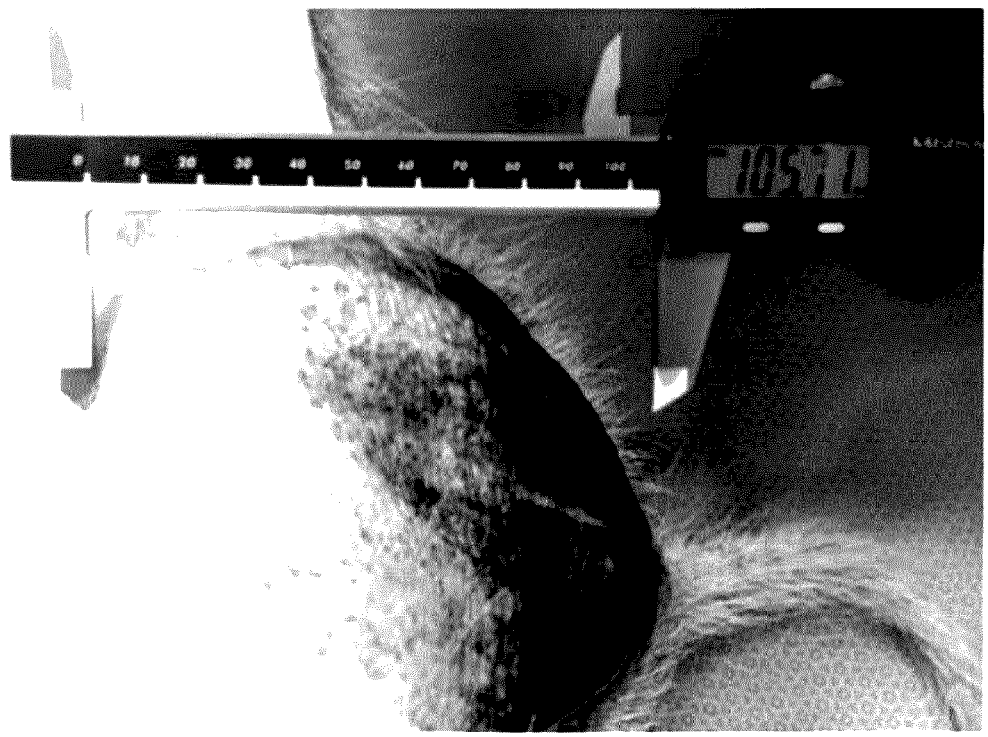

[Fig. 32]
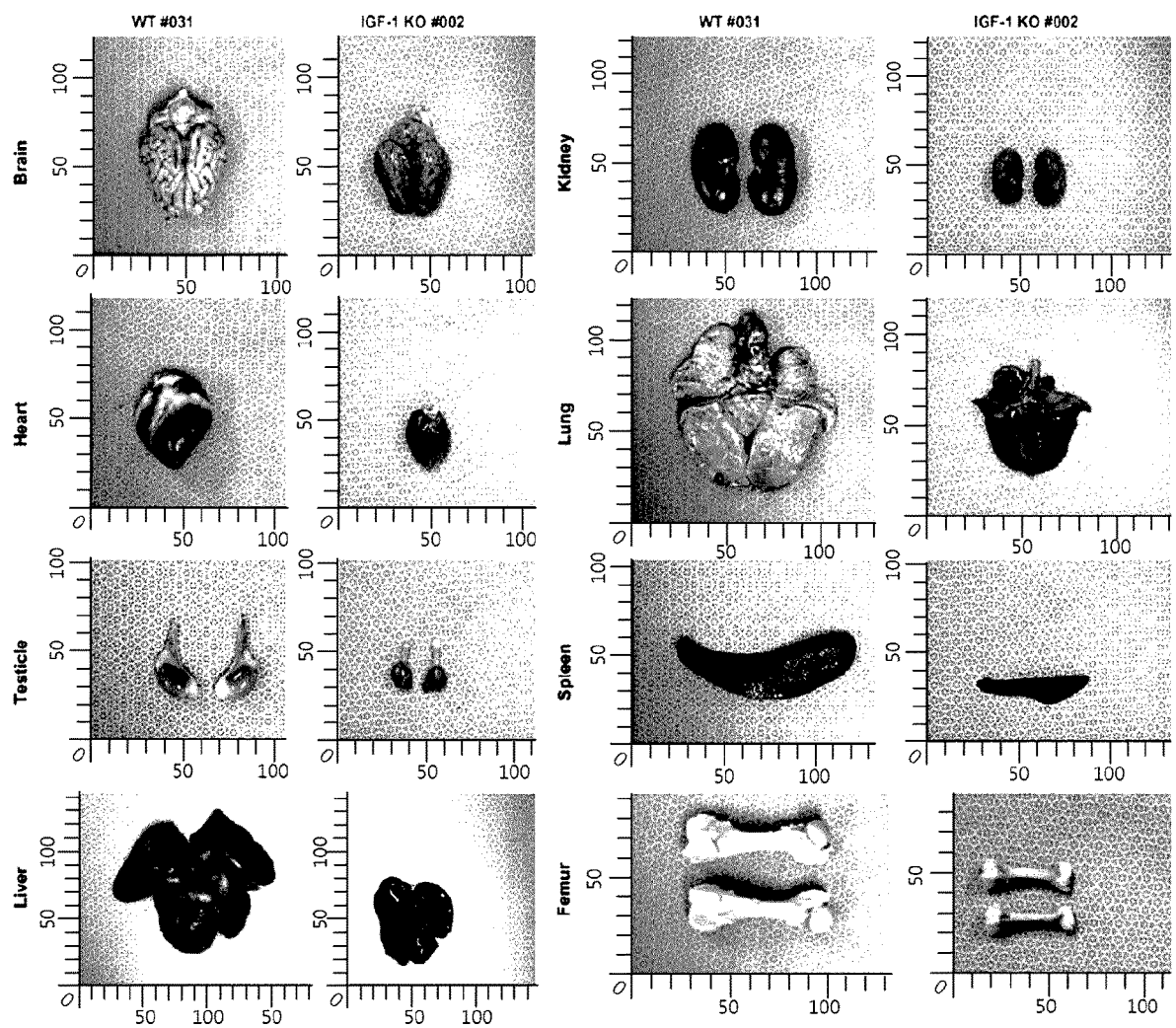

[Fig. 33]
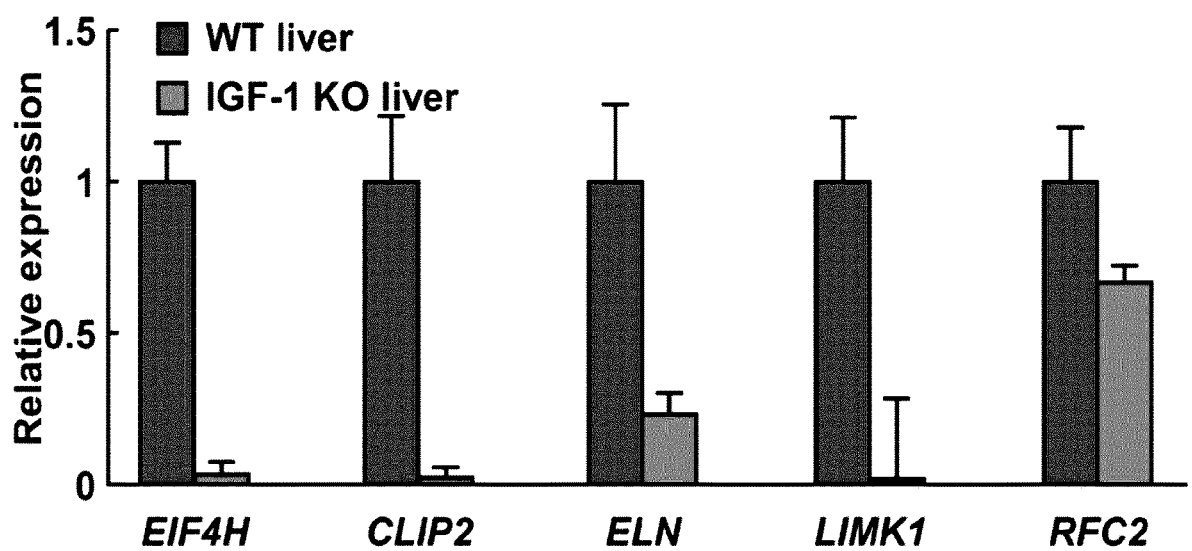

SEQUENCE LISTING

<160> NUMBER OF SEQ ID NOS: 39

<210> SEQ ID NO 1
<211> LENGTH: 23
<212> TYPE: DNA
<213> ORGANISM: Artificial Sequence
<220> FEATURE:
<223> OTHER INFORMATION: IGF-1 target sequence

<400> SEQUENCE: 1
gagggtctca ggtccagccg tgg                                                 23

<210> SEQ ID NO 2
<211> LENGTH: 23
<212> TYPE: DNA
<213> ORGANISM: Artificial Sequence
<220> FEATURE:
<223> OTHER INFORMATION: Complementary Sequence of IGF-1 target sequence

<400> SEQUENCE: 2
ccacggctgg acctgagacc ctc                                                 23

<210> SEQ ID NO 3
<211> LENGTH: 20
<212> TYPE: DNA
<213> ORGANISM: Artificial Sequence
<220> FEATURE:
<223> OTHER INFORMATION: IGF-1_forward

<400> SEQUENCE: 3
ttcagggttc cacaaggttc                                                     20

<210> SEQ ID NO 4
<211> LENGTH: 20
<212> TYPE: DNA
<213> ORGANISM: Artificial Sequence
<220> FEATURE:
<223> OTHER INFORMATION: IGF-1_reverse

<400> SEQUENCE: 4
atctctgagg ctgaggacga                                                     20

<210> SEQ ID NO 5
<211> LENGTH: 20
<212> TYPE: DNA
<213> ORGANISM: Artificial Sequence
<220> FEATURE:
<223> OTHER INFORMATION: #3 IGF-1 sequence

<400> SEQUENCE: 5
ccactggacc tgagaccctc                                                     20

<210> SEQ ID NO 6
<211> LENGTH: 24
<212> TYPE: DNA
<213> ORGANISM: Artificial Sequence
<220> FEATURE:
<223> OTHER INFORMATION: #7 IGF-1 sequence

<400> SEQUENCE: 6
ccacggcctg gacctgagac cctc                                                24

<210> SEQ ID NO 7
<211> LENGTH: 25
<212> TYPE: DNA
<213> ORGANISM: Artificial Sequence

```
<220> FEATURE:
<223> OTHER INFORMATION: #15 IGF-1 sequence

<400> SEQUENCE: 7
ccacggctct ggacctgaga ccctc                                                25

<210> SEQ ID NO 8
<211> LENGTH: 22
<212> TYPE: DNA
<213> ORGANISM: Artificial Sequence
<220> FEATURE:
<223> OTHER INFORMATION: #18 IGF-1 sequence

<400> SEQUENCE: 8
ccacggtgga cctgagaccc tc                                                  22

<210> SEQ ID NO 9
<211> LENGTH: 26
<212> TYPE: DNA
<213> ORGANISM: Artificial Sequence
<220> FEATURE:
<223> OTHER INFORMATION: #21 IGF-1 sequence

<400> SEQUENCE: 9
ccacggctgc tggacctgag accctc                                              26

<210> SEQ ID NO 10
<211> LENGTH: 20
<212> TYPE: DNA
<213> ORGANISM: Artificial Sequence
<220> FEATURE:
<223> OTHER INFORMATION: IGF-1

<400> SEQUENCE: 10
gagggtctca ggtccagccg                                                     20

<210> SEQ ID NO 11
<211> LENGTH: 20
<212> TYPE: DNA
<213> ORGANISM: Artificial Sequence
<220> FEATURE:
<223> OTHER INFORMATION: SCL25A36

<400> SEQUENCE: 11
gatggtctga ggtgcagccg                                                     20

<210> SEQ ID NO 12
<211> LENGTH: 20
<212> TYPE: DNA
<213> ORGANISM: Artificial Sequence
<220> FEATURE:
<223> OTHER INFORMATION: CACNA1E

<400> SEQUENCE: 12
gaaggactca ggtccagctg                                                     20

<210> SEQ ID NO 13
<211> LENGTH: 20
<212> TYPE: DNA
<213> ORGANISM: Artificial Sequence
<220> FEATURE:
<223> OTHER INFORMATION: DNAH8

<400> SEQUENCE: 13
gtgggtctca ggaccagctg                                                     20
```

```
<210> SEQ ID NO 14
<211> LENGTH: 20
<212> TYPE: DNA
<213> ORGANISM: Artificial Sequence
<220> FEATURE:
<223> OTHER INFORMATION: TRPV3

<400> SEQUENCE: 14
gagagtctca ggtccacccc                                        20

<210> SEQ ID NO 15
<211> LENGTH: 20
<212> TYPE: DNA
<213> ORGANISM: Artificial Sequence
<220> FEATURE:
<223> OTHER INFORMATION: PRDM11

<400> SEQUENCE: 15
gcggggctca ggtcctgccg                                        20

<210> SEQ ID NO 16
<211> LENGTH: 20
<212> TYPE: DNA
<213> ORGANISM: Artificial Sequence
<220> FEATURE:
<223> OTHER INFORMATION: U6

<400> SEQUENCE: 16
cagggtctca ggcccagctg                                        20

<210> SEQ ID NO 17
<211> LENGTH: 20
<212> TYPE: DNA
<213> ORGANISM: Artificial Sequence
<220> FEATURE:
<223> OTHER INFORMATION: PRKCZ

<400> SEQUENCE: 17 gagggggctca ggaccagccc                                       20

<210> SEQ ID NO 18
<211> LENGTH: 20
<212> TYPE: DNA
<213> ORGANISM: Artificial Sequence
<220> FEATURE:
<223> OTHER INFORMATION: IGF-1_forward

<400> SEQUENCE: 18
cggagacagg ggcttttatt                                        20

<210> SEQ ID NO 19
<211> LENGTH: 20
<212> TYPE: DNA
<213> ORGANISM: Artificial Sequence
<220> FEATURE:
<223> OTHER INFORMATION: IGF-1_reverse

<400> SEQUENCE: 19
ctccagcctc ctcagatcac                                        20

<210> SEQ ID NO 20
<211> LENGTH: 20
<212> TYPE: DNA
<213> ORGANISM: Artificial Sequence
<220> FEATURE:
<223> OTHER INFORMATION: IGF-2_forward
```

```
<400> SEQUENCE: 20
ggaagagtgc tgcttccgta                                               20

<210> SEQ ID NO 21
<211> LENGTH: 20
<212> TYPE: DNA
<213> ORGANISM: Artificial Sequence
<220> FEATURE:
<223> OTHER INFORMATION: IGF-2_reverse

<400> SEQUENCE: 21
ggggtatctg gggaagttgt                                               20

<210> SEQ ID NO 22
<211> LENGTH: 21
<212> TYPE: DNA
<213> ORGANISM: Artificial Sequence
<220> FEATURE:
<223> OTHER INFORMATION: IGFBP-1_forward

<400> SEQUENCE: 22
cgacatcaag aagtggaagg a                                             21

<210> SEQ ID NO 23
<211> LENGTH: 20
<212> TYPE: DNA
<213> ORGANISM: Artificial Sequence
<220> FEATURE:
<223> OTHER INFORMATION: IGFBP-1_reverse

<400> SEQUENCE: 23
ttgttgcagt tcggcagata                                               20

<210> SEQ ID NO 24
<211> LENGTH: 20
<212> TYPE: DNA
<213> ORGANISM: Artificial Sequence
<220> FEATURE:
<223> OTHER INFORMATION: IGFBP-2_forward

<400> SEQUENCE: 24
ggatgggaac gtgaacttgt                                               20

<210> SEQ ID NO 25
<211> LENGTH: 20
<212> TYPE: DNA
<213> ORGANISM: Artificial Sequence
<220> FEATURE:
<223> OTHER INFORMATION: IGFBP-2_reverse

<400> SEQUENCE: 25
gtgctgctcc gtgactttct                                               20

<210> SEQ ID NO 26
<211> LENGTH: 19
<212> TYPE: DNA
<213> ORGANISM: Artificial Sequence
<220> FEATURE:
<223> OTHER INFORMATION: IGFBP-3_forward

<400> SEQUENCE: 26
gacacgctga accacctca                                                19

<210> SEQ ID NO 27
```

```
<211> LENGTH: 20
<212> TYPE: DNA
<213> ORGANISM: Artificial Sequence
<220> FEATURE:
<223> OTHER INFORMATION: IGFBP-3_reverse

<400> SEQUENCE: 27
cgtacttatc cacgcaccag                                           20

<210> SEQ ID NO 28
<211> LENGTH: 20
<212> TYPE: DNA
<213> ORGANISM: Artificial Sequence
<220> FEATURE:
<223> OTHER INFORMATION: GAPDH_forward

<400> SEQUENCE: 28
ccctgagaca cgatggtgaa                                           20

<210> SEQ ID NO 29
<211> LENGTH: 20
<212> TYPE: DNA
<213> ORGANISM: Artificial Sequence
<220> FEATURE:
<223> OTHER INFORMATION: GAPDH_reverse

<400> SEQUENCE: 29
ggaggtcaat gaagggtca                                            20

<210> SEQ ID NO 30
<211> LENGTH: 20
<212> TYPE: DNA
<213> ORGANISM: Artificial Sequence
<220> FEATURE:
<223> OTHER INFORMATION: EIF4H_forward

<400> SEQUENCE: 30
acttcgtgtg gacattgcag                                           20

<210> SEQ ID NO 31
<211> LENGTH: 21
<212> TYPE: DNA
<213> ORGANISM: Artificial Sequence
<220> FEATURE:
<223> OTHER INFORMATION: EIF4H_reverse

<400> SEQUENCE: 31
gattctcgag agccacccat t                                         21

<210> SEQ ID NO 32
<211> LENGTH: 20
<212> TYPE: DNA
<213> ORGANISM: Artificial Sequence
<220> FEATURE:
<223> OTHER INFORMATION: CLIP2_forward

<400> SEQUENCE: 32
gttcccacca ggacagctaa                                           20

<210> SEQ ID NO 33
<211> LENGTH: 20
<212> TYPE: DNA
<213> ORGANISM: Artificial Sequence
<220> FEATURE:
<223> OTHER INFORMATION: CLIP2_reverse

<400> SEQUENCE: 33
```
agagctaccg aaagccaaca                    20

<210> SEQ ID NO 34
<211> LENGTH: 20
<212> TYPE: DNA
<213> ORGANISM: Artificial Sequence
<220> FEATURE:
<223> OTHER INFORMATION: LIMK1_forward

<400> SEQUENCE: 34
ctggggagct gaaataccac                    20

<210> SEQ ID NO 35
<211> LENGTH: 20
<212> TYPE: DNA
<213> ORGANISM: Artificial Sequence
<220> FEATURE:
<223> OTHER INFORMATION: LIMK1_reverse

<400> SEQUENCE: 35
gcccacagta gagcttggag                    20

<210> SEQ ID NO 36
<211> LENGTH: 20
<212> TYPE: DNA
<213> ORGANISM: Artificial Sequence
<220> FEATURE:
<223> OTHER INFORMATION: ELN_forward

<400> SEQUENCE: 36
agccaaatct gctgctaagg                    20

<210> SEQ ID NO 37
<211> LENGTH: 20
<212> TYPE: DNA
<213> ORGANISM: Artificial Sequence
<220> FEATURE:
<223> OTHER INFORMATION: ELN_reverse

<400> SEQUENCE: 37
gtactgcacc tgccccaaag                    20

<210> SEQ ID NO 38
<211> LENGTH: 19
<212> TYPE: DNA
<213> ORGANISM: Artificial Sequence
<220> FEATURE:
<223> OTHER INFORMATION: RFC2_forward

<400> SEQUENCE: 38
gttcaaggtc tgcgacgag                     19

<210> SEQ ID NO 39
<211> LENGTH: 20
<212> TYPE: DNA
<213> ORGANISM: Artificial Sequence
<220> FEATURE:
<223> OTHER INFORMATION: RFC2_reverse

<400> SEQUENCE: 39
aatagccaag atgccacagg                    20

DWARFISM ANIMAL MODEL HAVING IGF-1 GENETIC MUTATION AND METHOD FOR PRODUCING SAME

TECHNICAL FIELD

The present disclosure relates to a dwarfism animal model carrying an IGF-1 gene mutation and a method for generating the same.

The present disclosure was made with the support of the Korean government under grant number KGM4251824 ("Project for Development of Universal/Customized Artificial Blood Using Mini-Pig Resources") awarded by the Ministry of Science, ICT and Future Planning.

BACKGROUND ART

The principal feature of Laron syndrome is abnormally short stature (dwarfism), and physical symptoms thereof include complex phenotypes such as a prominent forehead, a small cranium, underdevelopment of mandible, truncal obesity, insufficient hair, underdevelopment of bones (teeth, cranium, and femur), a depressed nasal bridge, a double chin, a small genital, short-limbed dwarfism, and delayed puberty. It is known that the cause of these symptoms is mainly related to mutations in growth hormones (GH) and GH receptor genes, and these symptoms appear due to reduction or deficiency of IGF-1. Accordingly, for the development of a therapeutic agent for Laron syndrome, it is necessary to develop an animal model that may closely mimic the phenotypes of Laron syndrome so that the efficacy and safety of the therapeutic agent may be evaluated.

Until now, as a disease model for drug treatment of genetic disease or studies on genetic disease mechanisms, rodents have been used in most cases. However, since the pathology and symptoms of the animal disease model show significant differences from those observed in humans, many problems arose when conducting a clinical trial based on the results obtained from the rodent disease model.

That is, a model animal that exhibits all symptoms of human genetic disease so as to be usable as an effective disease model has not yet been established. Thus, due to problems resulting from the distinct differences in anatomy/physiology, reproduction, lifespan and behavior patterns between model animals and humans, the need for a disease animal model using a species closer to humans has been raised, and there has been an increasing demand to utilize pigs, which enable studies on incurable diseases, as new model animals in the field of biopharmaceuticals.

Laron syndrome model animals developed to date include IGF-1 knockout mice, but it has been reported that the IGF-1 knockout mice die one day after birth due to difficulty in breathing. In order to overcome this problem, mice with IGF-1 knocked out specifically in the liver responsible for 75% of IGF-1 production were developed using the Cre/loxp conditional system. The mice showed a decrease of 75% or higher in the level of IGF-I circulating in the blood, but had a problem in that the phenotype thereof is not different from that of normal mice.

In recent years, transgenic cloned mini-pigs with a growth hormone receptor gene knocked out using genetic scissors have been produced, but only some of the phenotypes (dwarfism and obesity) seen in Laron syndrome patients were observed in the mini-pigs. That is, model animals that exhibit all the symptoms of Laron syndrome so as to be usable as an effective disease model have not yet been established.

Accordingly, the present inventors have conducted studies to develop a transgenic animal that exhibits various phenotypes seen in dwarfism such as Laron syndrome, thereby completing the present disclosure.

DISCLOSURE

Technical Problem

An object of the present disclosure is to provide a recombinant expression vector comprising: a nucleotide sequence encoding a guide RNA (gRNA) that hybridizes to a DNA encoding an insulin-like growth factor 1 (IGF-1) gene; a nucleotide sequence encoding a Cas9 protein; and a promoter operably linked to the nucleotide sequence.

Another object of the present disclosure is to provide a transgenic cell line for generating a dwarfism animal model, the transgenic cell line comprising the recombinant expression vector.

Still another object of the present disclosure is to provide a method for generating a dwarfism animal model, the method comprising steps of: forming a nuclear transfer embryo by transferring a transgenic cell line for generating a dwarfism animal model into an enucleated oocyte obtained from an animal other than a human; and transferring the nuclear transfer embryo into the oviduct of a recipient female, which is an animal other than a human.

Yet another object of the present disclosure is to provide a dwarfism animal model carrying an IGF-1 gene mutation.

Technical Solution

One aspect of the present disclosure provides a recombinant expression vector comprising: a nucleotide sequence encoding a guide RNA (gRNA) that hybridizes to a DNA encoding an insulin-like growth factor 1 (IGF-1) gene; a nucleotide sequence encoding a Cas9 protein; and a promoter operably linked to the nucleotide sequence.

According to one embodiment of the present disclosure, the gRNA may comprise a nucleotide sequence complementary to the nucleotide sequence of SEQ ID NO: 2.

Another aspect of the present disclosure provides a transgenic cell line for generating a dwarfism animal model, the transgenic cell line comprising the recombinant expression vector.

Still another aspect of the present disclosure provides a method for generating a dwarfism animal model, the method comprising steps of: forming a nuclear transfer embryo by transferring a transgenic cell line for generating a dwarfism animal model into an enucleated oocyte obtained from an animal other than a human; and transferring the nuclear transfer embryo into the oviduct of a recipient female, which is an animal other than a human.

According to one embodiment of the present disclosure, the animal may be a mini-pig.

According to one embodiment of the present disclosure, the dwarfism may be caused by IGF-1 knockout.

According to one embodiment of the present disclosure, the knockout may be caused by mutation of a nucleotide sequence corresponding to SEQ ID NO: 2 to the nucleotide sequence of any one selected from the group consisting of SEQ ID NO: 5 to SEQ ID NO: 9.

According to one embodiment of the present disclosure, the dwarfism may be Laron syndrome.

Yet another aspect of the present disclosure provides a dwarfism animal model carrying an IGF-1 gene mutation.

According to one embodiment of the present disclosure, the dwarfism animal model may be one wherein the IGF-1 gene has been knocked out.

According to one embodiment of the present disclosure, the knockout may be caused by mutation of a nucleotide sequence corresponding to SEQ ID NO: 2 to the nucleotide sequence of any one selected from the group consisting of SEQ ID NO: 5 to SEQ ID NO: 9.

According to one embodiment of the present disclosure, the animal model may have decreased expression of any one or more genes selected from the group consisting of EIF4H, CLIP2, ELN, LIMK1 and RFC2.

According to one embodiment of the present disclosure, the animal model may be for a Laron syndrome or Williams-Beuren syndrome model.

According to one embodiment of the present disclosure, the animal may be a mini-pig.

According to one embodiment of the present disclosure, the mini-pig may be a pet mini-pig.

According to one embodiment of the present disclosure, the mini-pig may be for xenogeneic organ transplantation.

According to one embodiment of the present disclosure, the mini-pig may be for artificial blood development.

Advantageous Effects

According to the dwarfism animal model carrying an IGF-1 gene mutation and the method for generating the same, the problem that an animal dies immediately after birth is overcome, the majority of phenotypes seen in Laron syndrome patients may be observed in the dwarfism animal model, and the dwarfism animal model has decreased expression of personality genes. Thus, the dwarfism animal model may be effectively used as a dwarfism-related disease model.

BRIEF DESCRIPTION OF DRAWINGS

FIG. 1 is a view showing an IGF-1 nucleotide sequence to which the genetic scissors CRISPR/Cas9 guide RNA (gRNA) located at porcine IGF-1 exon 2 hybridizes.

FIG. 2 is a view showing the structure of a porcine IGF-1 reporter vector in an IGF-1 knockout CRISPR/Cas9 surrogate reporter system.

FIG. 3 is a view showing the structure of a porcine IGF-1 gRNA vector in the IGF-1 knockout CRISPR/Cas9 surrogate reporter system.

FIG. 4 is a view showing the structure of a Cas9 vector in the IGF-1 knockout CRISPR/Cas9 surrogate reporter system.

FIG. 5 depicts fluorescence micrographs verifying the introduction and operation of an IGF-1 knockout CRISPR/Cas9 expression vector system.

FIG. 6 depicts graphs showing flow cytometry results verifying the introduction and operation of the IGF-1 knockout CRISPR/Cas9 expression vector system.

FIG. 7 shows mutations (#3 to #21) of the IGF-1 nucleotide sequence, to which gRNA hybridizes, in a normal mini-pig donor cell line (WT) into which the IGF-1 knockout CRISPR/Cas9 expression vector system has been introduced.

FIG. 8 is a view showing the change in amino acid codon of IGF-1 gene by insertion of a nucleotide sequence in IGF-1 knockout (KO) transgenic donor cell #7. The portion marked in red is a stop codon.

FIG. 9 is a view showing the change in amino acid codon of IGF-1 gene by insertion of a nucleotide sequence in IGF-1 knockout (KO) transgenic donor cell #15. The portion marked in red is a stop codon.

FIG. 10 shows the results of karyotyping of IGF-1 knockout (KO) transgenic donor cell #7.

FIG. 11 shows the results of karyotyping of IGF-1 knockout (KO) transgenic donor cell #15.

FIG. 12 is a schematic diagram showing a process of producing IGF-1 knockout transgenic mini-pigs by somatic cell cloning and transfer into a surrogate pig.

FIG. 13 shows photographs of an IGF-1 knockout transgenic mini-pig fetus aborted on day 35 of pregnancy and an IGF-1 knockout transgenic mini-pig crushed to death by a surrogate pig on day 2 after birth. The yellow circle indicates an area crushed by the surrogate pig.

FIG. 14 shows photographs comparing a 56-day-old IGF-1 knockout (KO) transgenic mini-pig with a normal (WT) mini-pig.

FIG. 15 shows that the IGF-1 nucleotide sequence to which gRNA hybridizes in aborted, died and alive IGF-1 knockout transgenic mini-pigs is the same as that in transgenic donor cell line #15.

FIGS. 16 and 17 show nucleotide sequencing results indicating that no off-target mutation occurs in nucleotide sequences similar to an IGF-1 target sequence, except the IGF-1 target sequence.

FIG. 18 is a graph showing the relative mRNA expression levels of IGF-1, IGF-2, IGFBP1, IGFBP2 and IGFBP3 genes in an IGF-1 knockout transgenic cloned mini-pig crushed to death by a surrogate pig on day 2 after birth and a normal mini-pig.

FIG. 19 is a graph comparing the hematological levels of growth hormone (GH), insulin (INS) and IGF-1 hormone between an alive IGF-1 knockout transgenic cloned mini pig and a normal mini pig.

FIG. 20 is a graph showing the body weights of normal mini-pigs and an IGF-1 knockout transgenic cloned mini-pig during a period ranging from birth to 27 days after birth.

FIG. 21 depicts photographs comparing the sizes between an IGF-1 knockout transgenic cloned mini-pig and normal mini-pigs after euthanasia around 20 days after birth.

FIG. 22 depicts photographs comparing the sizes between a 3-month-old IGF-1 knockout transgenic cloned mini-pig and a 3-month-old normal mini-pig.

FIG. 23 depicts photographs comparing the truncal obesity between a 3-month-old IGF-1 knockout transgenic cloned mini-pig and a 3-month-old normal mini-pig.

FIG. 24 is a graph showing the results of correcting the abdominal girth of a 3-month-old IGF-1 knockout transgenic mini-pig based on the abdominal girth (100%) of a normal mini-pig using the body length and height thereof and performing comparison.

FIG. 25 depicts CT photographs comparing the head of a 3-month old IGF-1 knockout transgenic cloned mini-pig with the head of a 3-month old normal mini-pig.

FIG. 26 depicts photographs showing whether the cranium of a 3-month-old IGF-1 knockout transgenic cloned mini-pig was sutured, in comparison with a 3-month-old normal mini-pig.

FIG. 27 shows the results of correcting the head circumference of a 3-month-old IGF-1 knockout mini-pig based on the head circumference (100%) of a normal mini-pig using the horizontal and vertical circumferences thereof and performing comparison.

FIG. 28 depicts photographs comparing the occipital hair between a 3-month-old IGF-1 knockout transgenic cloned mini-pig and a 3-month-old normal mini-pig.

FIG. 29 depicts photographs comparing the forelimb ankle thicknesses between a 3-month-old IGF-1 knockout transgenic cloned mini-pig and a 3-month-old normal mini-pig.

FIG. 30 depicts photographs comparing the testis (intraperitoneal testis or undescended testis; cryptorchisism) of an IGF-1 knockout transgenic cloned mini-pig with the testis (normally descended) of a normal mini-pig around 20 days after birth.

FIG. 31 depicts photographs comparing the testis thicknesses between a 3-month-old IGF-1 knockout transgenic cloned mini-pig and a 3-month-old normal mini-pig.

FIG. 32 depicts photographs comparing the brain, heart, lung, liver, spleen, pancreas, kidney, femur and testes between a 20-day-old IGF-1 knockout transgenic cloned mini-pig and a 20-day-old normal mini-pig.

FIG. 33 is a graph comparing the mRNA expression levels of the personality genes EIF4H, CLIP2, ELN, LIMK1 and RFC2 between an IGF-1 knockout transgenic cloned mini-pig crushed to death by a surrogate pig around 2 days after birth and a normal mini-pig.

BEST MODE

One aspect of the present disclosure provides a recombinant expression vector comprising: a nucleotide sequence encoding a guide RNA (gRNA) that hybridizes to a DNA encoding an insulin-like growth factor 1 (IGF-1) gene; a nucleotide sequence encoding a Cas9 protein; and a promoter operably linked to the nucleotide sequence.

In the present specification, there is provided a method of producing a transgenic animal, which has various phenotypes seen in dwarfism, specifically Laron syndrome, by knocking out the IGF-1 gene using IGF-1-specific genetic scissors with the CRISPR/Cas9 system and applying a transgenic somatic cell cloning technique As used herein, the term "CRISPR/Cas9 system" refers to third-generation genetic scissors composed of Cas9 protein and guide RNA, and is an artificial restriction enzyme designed to cut a desired gene sequence using a CRISPR (Clustered Regularly Interspaced Short Palindromic Repeats) system known as a microbial immune system.

As used herein, the term "Cas9 protein" refers to an essential protein element in the CRISPR/Cas9 system, which may act as active endonuclease or nickase by forming a complex with two RNAs called CRISPR RNA (crRNA) and trans-activating crRNA (tracrRNA). The Cas9 protein may be derived from *Staphylococcus* sp., *Streptococcus* sp., *Neisseria* sp., *Pasteurella* sp., *Francisella* sp., or *Campylobacter* sp.

As used herein, the term "guide RNA (gRNA)" refers to an RNA specific to a target DNA. gRNA may form a complex with the Cas9 protein, and may direct the Cas9 protein to a target DNA. gRNA may be crRNA and tracrRNA, or may be a single guided RNA (sgRNA) in which crRNA and tracrRNA are linked to each other.

When a cell is transformed with the recombinant expression vector of the present disclosure, a gRNA fragment may be delivered into the cell, and the delivered gRNA fragment may recognize the IGF-1 gene. The recombinant expression vector may further comprise tracrRNA. Therefore, when a cell is transformed with the recombinant expression vector, a gRNA fragment and a tracrRNA fragment or an sgRNA in which crRNA and tracrRNA are linked to each other may be delivered into the cell, and the delivered tracrRNA fragment or moiety may serve to form a complex or linkage structure with a crRNA fragment or moiety, thus forming a structure that may be recognized by the Cas9 protein.

IGF-1 is a 70-amino acid protein having a molecular weight of 7,649 Da and a pI (isoelectric point) of 84, regulates the action of growth hormones, has insulin-like and mitogenic biological activities, and belongs to the somatomedin A family. Growth promotion through IGF-1 is the greatest way to regulate growth by growth hormone, and if IGF-1 secretion decreases even though the growth hormone concentration is normal, a more serious Laron syndrome than usual dwarfism may occur. The recombinant expression vector of the present disclosure may specifically knock out (KO) only the IGF-1 gene in a nuclear transfer donor cell in a process of producing a transgenic animal model by somatic cell cloning, without an off-target problem, and thus may be effectively used for the generation of an animal model of dwarfism, particularly Lardon syndrome.

As used herein, the term "knockout" means modifying or removing the nucleotide sequence of a specific gene in the base sequence so that the gene cannot be expressed.

As used herein, the term "recombinant expression vector" refers to a recombinant DNA molecule containing a desired coding sequence and appropriate nucleic acid sequences essential for the expression of an operably linked coding sequence in a particular host organism. Promoters, enhancers, and termination and polyadenylation signals, which may be used in eukaryotic cells, are known.

As used herein, the term "operably linked" refers to a functional linkage between a gene expression control sequence and another nucleotide sequence. The gene expression control sequence may be at least one selected from the group consisting of a replication origin, a promoter, and a transcription termination sequence (terminator). The transcription termination sequence may be a polyadenylation sequence (pA), and the replication origin may be, but is not limited to, an f1 replication origin, an SV40 replication origin, a pMB1 replication origin, an adeno replication origin, an AAV replication origin or a BBV replication origin.

As used herein, the term "promoter" means a region of DNA upstream from the structural gene, and refers to a DNA molecule to which RNA polymerase binds to initiate transcription.

The promoter according to one embodiment of the present disclosure is one of the transcription control sequences which regulate the transcription initiation of a specific gene, and may be a polynucleotide fragment of about 100 bp to about 2,500 bp in length. The promoter can be used without limitation as long as it can regulate transcription initiation in cells, for example, eukaryotic cells (e.g., plant cells or animal cells (e.g., mammalian cells such as human or mouse cells)). For example, the promoter may be selected from the group consisting of a cytomegalovirus (CMV) promoter (e.g., human or mouse CMV immediate-early promoter), U6 promoter, EF1-alpha (elongation factor 1-a) promoter, EF1-alpha short (EFS) promoter, SV40 promoter, adenovirus promoter (major late promoter), pL-λ promoter, trp promoter, lac promoter, tac promoter, T7 promoter, vaccinia virus 7.5K promoter, HSV tk promoter, SV40E1 promoter, respiratory syncytial virus (RSV) promoter, metallothionin promoter, β-actin promoter, ubiquitin C promoter, human interleukin-2 (IL-2) gene promoter, human lymphotoxin gene promoter, and human granulocyte-macrophage colony stimulating factor (GM-CSF) gene promoter, but is not limited thereto.

The recombinant expression vector according to one embodiment of the present disclosure may be selected from the group consisting of plasmid vectors, cosmid vectors, and viral vectors such as bacteriophage vectors, adenovirus vectors, retroviral vectors, and adeno-associated viral vectors. A vector that may be used as the recombinant expression vector may be constructed based on, but not limited to, a plasmid (e.g., pcDNA series, pSC101, pGV1106, pACYC177, ColE1, pKT230, pME290, pBR322, pUC8/9, pUC6, pBD9, pHC79, pIJ61, pLAFR1, pHV14, pGEX series, pET series, pUC19, etc.), a phage (e.g., λgt4λB, λ-Charon, λΔz1, M13, etc.), a viral vector (e.g., an adeno-associated viral (AAV) vector, etc.), or the like, which is used in the art.

The recombinant expression vector of the present disclosure may further comprise at least one selectable marker. The marker is generally a nucleic acid sequence having the property capable of being selected by a conventional chemical method, and includes any gene capable of distinguishing a transfected cell from a non-transfected cell. Examples of the marker include, but are not limited to, genes resistant to herbicides such as glyphosate, glufosinate ammonium or phosphinothricin, and genes resistant to antibiotics such as ampicillin, kanamycin, G418, bleomycin, hygromycin or chloramphenicol.

The recombinant expression vector of the present disclosure may be constructed using a gene recombination technique well known in the art, and site-specific DNA cleavage and ligation may be performed using enzymes generally known in the art.

According to one embodiment of the present disclosure, the gRNA may comprise a nucleotide sequence complementary to the nucleotide sequence of SEQ ID NO: 2.

The use of the gRNA comprising a nucleotide sequence complementary to the nucleotide sequence of SEQ ID NO: 2 may efficiently induce the change in the amino acid codon of IGF-1 and/or the generation of a premature stop codon.

Another aspect of the present disclosure provides a transgenic cell line for generating a dwarfism animal model, the transgenic cell line comprising a recombinant expression vector comprising: a nucleotide sequence encoding a guide RNA (gRNA) that hybridizes to a DNA encoding an insulin-like growth factor 1 (IGF-1) gene; a nucleotide sequence encoding a Cas9 protein; and a promoter operably linked to the nucleotide sequence.

As used herein, the term "dwarfism" refers to a condition where a subject is smaller than the body size corresponding to the age of the subject. The dwarfism animal model of the present disclosure may particularly closely mimic the phenotype of "Laron syndrome", a genetic disease in which the biological effect of growth hormone decreases or is lost even though the production and secretion of growth hormone is within a normal range or is high.

In order to produce a transgenic cell line comprising the recombinant expression vector according to one embodiment of the present disclosure, a method known in the art for introducing a nucleic acid molecule into an organism, a cell, a tissue or an organ may be used, and as known in the art, a suitable standard technique selected depending on the host cell may be performed. Examples of this method include, but are not limited to, electroporation, calcium phosphate ($CaPO_4$) precipitation, calcium chloride ($CaCl_2$)) precipitation, microinjection, polyethylene glycol (PEG) method, DEAE-dextran method, cationic liposome method, and lithium acetate-DMSO method.

The type of cell to be used as the transgenic cell line may be animal cells or cells derived from animal cells, preferably somatic cells derived from mammals, most preferably somatic cells derived from pigs or mini-pigs. When somatic cells derived from mini-pigs are used as the transgenic cell line, it is possible to overcome the problem of mini-pigs dying immediately after birth and also to closely mimic the phenotypes of dwarfism, particularly Laron syndrome.

Still another aspect of the present disclosure provides a method for generating a dwarfism animal model, the method comprising steps of: forming a nuclear transfer embryo by transferring a transgenic cell line for generating a dwarfism animal model into an enucleated oocyte obtained from an animal other than a human, the transgenic cell line comprising a recombinant expression vector comprising: a nucleotide sequence encoding a guide RNA (gRNA) that hybridizes to a DNA encoding an insulin-like growth factor 1 (IGF-1) gene; a nucleotide sequence encoding a Cas9 protein; and a promoter operably linked to the nucleotide sequence; and transferring the nuclear transfer embryo into the oviduct of a recipient female, which is an animal other than a human.

The method for generating a dwarfism animal model may be performed by somatic cell nuclear transfer (SCNT). "Somatic cell nuclear transfer" is a gene manipulation technique capable of producing offspring without passing through meiotic and haploid germ cells, which generally occur in the reproductive process, and is a method comprising transferring a polyploid somatic cell of an adult into an enucleated oocyte to produce an embryo, and transferring the embryo into a living body to generate a new individual.

As used herein, the term "nuclear transfer embryo" refers to an oocyte produced by insertion or fusion of a nuclear donor cell, and "fusion" refers to a combination of a nuclear donor cell and a lipid membrane portion of an oocyte. For example, the lipid membrane may be the plasma membrane or nuclear membrane of a cell. Fusion may occur upon application of an electrical stimulus between a nuclear donor cell and a recipient oocyte when they are placed adjacent to each other or when a nuclear donor cell is placed in a perivitelline space of a recipient oocyte. The "transgenic cell line" is a nuclear donor cell and refers to a cell or a nucleus of the cell which transfers the nucleus into an oocyte functioning as a nuclear recipient. The term "oocyte" preferably refers to a mature oocyte which has reached metaphase II of meiosis, and may be more preferably a porcine oocyte.

According to one embodiment of the present disclosure, the animal may be a mini-pig.

Pigs have been recognized to be anatomically and physiologically similar to humans and have been already used in studies on the pathological mechanisms and treatment of various diseases. Particularly, pigs have been recognized as an economic animal for a long time, and thus the use thereof can avoid ethical problems, unlike when other medium/large animals are used as disease models. In addition, since a stable breeding system for pigs is already established, pigs are advantageously easy to maintain and control during development of an experimental animal model.

According to one embodiment of the present disclosure, the dwarfism may be caused by IGF-1 knockout.

The dwarfism animal model may be generated by IGF-1 knockout through substitution or deletion of one or more of nucleotides constituting the IGF-1 genes, or insertion of one or more nucleotides.

According to one embodiment of the present disclosure, the knockout may be caused by mutation of a nucleotide sequence corresponding to SEQ ID NO: 2 to the nucleotide sequence of any one selected from the group consisting of SEQ ID NO: 5 to SEQ ID NO: 9.

SEQ ID NO: 5 is a nucleotide sequence resulting from deletion of the $5^{th}$ to $7^{th}$ nucleotides "GGC" in the nucleotide sequence of SEQ ID NO: 2. SEQ ID NO: 6 is a nucleotide sequence resulting from addition of "C" after the 7th nucleotide in the nucleotide sequence of SEQ ID NO: 2. SEQ ID NO: 7 is a nucleotide sequence resulting from addition of "CT" after the $8^{th}$ nucleotide in the nucleotide sequence of SEQ ID NO: 2. SEQ ID NO: 8 is a nucleotide sequence resulting from deletion of the $7^{th}$ nucleotide "C" in the nucleotide sequence of SEQ ID NO: 2. SEQ ID NO: 9 is a nucleotide sequence resulting from addition of "CTG" after the $9^{th}$ nucleotide in the nucleotide sequence of SEQ ID NO: 2.

According to an embodiment of the present disclosure, the dwarfism may be Laron syndrome.

In conventional growth hormone receptor knockout transgenic mini-pigs, parts related to size reduction and obesity have been mainly reported. In addition, it has been reported that conventional growth hormone receptor knockout transgenic mini-pigs have normal sizes at birth, but show differences in size/weight due to a problem occurring in the later growth process, and no delayed puberty is observed in the knockout transgenic mini-pigs. On the other hand, the animal model of the present disclosure exhibits various phenotypes seen in Laron syndrome patients, specifically, problems with growth and development (size and weight) appearing from birth, a prominent forehead, unclosed cranial suture, short nose length, a small cranium, insufficient teeth, insufficient hair, short-limbed dwarfism, and delayed puberty. Thus, the animal model of the present disclosure is suitable as an animal model of dwarfism, particularly Laron syndrome.

Yet another aspect of the present disclosure provides a dwarfism animal model carrying an insulin-like growth factor 1 (IGF-1) gene mutation.

As used herein, the term "animal model" refers to an animal having a disease very similar to a human disease. The reason why disease model animals have significance in studies on human diseases is because of the physiological or genetic similarities between humans and animals. In disease studies, biomedical disease model animals may provide data for studies on various causes of diseases and the onset processes and diagnosis of diseases. Thus, through studies on disease model animals, it is possible to find out genes related to diseases and to understand the interactions between genes, and through examination of the actual efficacy and toxicity of developed new drug candidates, it is possible to obtain basic data for determining the possibility of practical use of the new drug candidates.

In the dwarfism animal model of the present disclosure, contents overlapping with the above description may be used in the same sense as described above.

As used herein, the term "mutation" refers to a state in which a particular genotype has changed with a change in genetic information due to a change in the nucleotide sequence of a particular gene. Examples of this mutation include point mutations, deletion mutations, insertion mutations, missense mutations and nonsense mutations. The present disclosure provides a dwarfism animal model in which the expression of the IGF-1 gene is reduced due to a mutation in the IGF-1 gene by the CRISPR/Cas9 system.

According to one embodiment of the present disclosure, the animal model may be one wherein the IGF-1 gene is knocked out.

According to one embodiment of the present disclosure, the knockout may be caused by mutation of a nucleotide sequence corresponding to SEQ ID NO: 2 to the nucleotide sequence of any one selected from the group consisting of SEQ ID NO: 5 to SEQ ID NO: 9.

According to one embodiment of the present disclosure, the animal model may have decreased expression of one or more genes selected from the group consisting of EIF4H, CLIP2, ELN, LIMK1 and RFC2.

As used herein, the term "personality genes" refers to genes associated with hyper-sociality. It has been found that these genes are associated with personality because the expression thereof decreases in Williams-Beuren syndrome in humans.

According to one embodiment of the present disclosure, the animal model may be for a Laron syndrome or Williams-Beuren syndrome model.

As used herein, the term "Williams-Beuren syndrome" is a disorder characterized by excessive kindness to people, lack of inhibitions about strangers, hyper-sociality, and impaired health and appearance with slightly low intelligence. The dwarfism animal model of the present disclosure exhibits behavior patterns similar to those of Williams-Beuren syndrome due to decreased expression of the personality genes EIF4H, CLIP2, ELN, LIMK1 and RFC2.

According to one embodiment of the present disclosure, the animal may be a mini-pig.

According to one embodiment of the present disclosure, the mini-pig may be a pet mini-pig.

The mini-pig of the present disclosure may look cute because it is small in size and plump compared to a normal mini-pig. In addition, the mini-pig of the present disclosure follows a person well due to decreased expression of the personality genes. Thus, the mini-pig of the present disclosure may be useful as a pet animal.

According to one embodiment of the present disclosure, the mini-pig may be for xenogeneic organ transplantation.

Since the mini pig of the present disclosure is smaller in size than a normal mini-pig, it may be bred in a larger number than common pigs in a limited space. In addition, since the mini-pig of the present disclosure has smaller organs than a normal mini-pig, it may be advantageously bred and used as a donor animal for xenogeneic organ transplantation into patients in need of small organs.

According to one embodiment of the present disclosure, the mini-pig may be for artificial blood development.

As used herein, the term "artificial blood" refers to a human blood substitute that may perform functions such as oxygen supply in the human body, transport of waste products, antibacterial action and/or nutrient transport. Examples of the artificial blood include artificial red blood cells having genetically engineered recombinant human hemoglobin.

Since the mini-pig of the present disclosure is smaller in size than a normal mini-pig, it may be bred in a larger number than common pigs in a limited space. Thus, for example, the mini-pig of the present disclosure may be effectively used as a transgenic animal for producing recombinant human hemoglobin through genetic manipulation or as a surrogate pig for human stem cell transplantation.

MODE FOR INVENTION

Hereafter, the present disclosure will be described in more detail with reference to one or more examples. However, these examples serve to explain the present disclosure by way of example, and the scope of the present disclosure is not limited to these examples.

Example 1. Construction of IGF-1 Knockout CRISPR/Cas9 Expression System 1-1. IGF-1 Knockout CRISPR/Cas9 Expression Vector System CRISPR/Cas9 genetic scissors were designed by targeting exon 2 among four exons of the porcine IGF-1 gene. The specific porcine IGF-1 gene locus is shown in FIG. 1, and the IGF-1 target nucleotide sequence, the protospacer adjacent motif (PAM) sequence and the IGF-1 nucleotide sequence (a sequence complementary to the IGF-1 target nucleotide sequence) to which sgRNA hybridizes are shown in Table 1 below.

TABLE 1

|  | Nucleotide sequence (5'-3') | SEQ ID NO |
|---|---|---|
| IGF-1 target sequence | GAGGGTCTCAGGTCCAGCCGTGG | SEQ ID NO: 1 |
| SgRNA-hybridizing IGF-1 sequence | CCACGGCTGGACCTGAGACCCTC | SEQ ID NO: 2 |

An IGF-1 knockout CRISPR/Cas9 system was constructed as a surrogate reporter system including a total of three vectors.

Specifically, as shown in FIG. 2, a reporter vector was constructed in which a sequence encoding mRFP1 (monomeric red fluorescent protein 1) is located upstream of the sgRNA-hybridizing IGF-1 nucleotide sequence and a sequence encoding EGFP (enhanced green fluorescent protein) is located downstream of the sgRNA-hybridizing IGF-1 nucleotide sequence. In addition, as shown in FIG. 3, an sgRNA vector was constructed by inserting an sgRNA-encoding nucleotide sequence, and as shown in FIG. 4, a Cas9 vector was constructed by inserting a sequence encoding a Cas9 protein for recognizing an sgRNA, which is expressed from the sgRNA vector and bound to the sgRNA-hybridizing IGF-1 nucleotide sequence, and cleaving the IGF-1 target sequence.

For the IGF-1 gene target sgRNA vector, in order to achieve the highest knockout efficiency in the IGF-1-encoding region using CRISPR, four target specific sites with higher out-of-frame scores were created through published design tools The designed Cas9, sgRNA and RGS reporter vectors were synthesized by and purchased from ToolGen, Inc. (Seoul, Korea).

Since mRFP (red fluorescence) is expressed in cells into which the CRISPR/Cas9 system of the present disclosure has been introduced, verification may be made as to whether the CRISPR/Cas9 system of the present disclosure was introduced into cells. Meanwhile, when the IGF-1 target sequence contained in the reporter vector is cleaved by the Cas9 protein expressed from the Cas9 vector, EGFP (green fluorescence) is expressed in cells into which the CRISPR/Cas9 system of the present disclosure was introduced. Thus, it is possible to verify whether or not the CRISPR/Cas9 system of the present invention disclosure operates normally by checking whether green fluorescence is emitted.

1-2. Verification of IGF-1 Knockout CRISPR/Cas9 Expression Vector System—Fluorescence Microscope Analysis For production of an IGF-1 knockout transgenic cloned mini-pig, the IGF-1 knockout CRISPR/Cas9 expression vector system constructed in Example 1-1 was introduced into a normal mini-pig donor cell line for somatic cell cloning, and then the introduction and operation of the vector system was checked through fluorescence microscopy analysis.

Specifically, donor cells were obtained from the renal tissue of a KSP mini-pig (2-day-old, male), and the renal tissue was cold-stored in DPBS wash buffer containing 10% (v/v) penicillin/streptomycin (Invitrogen) until isolation. Then, the renal tissue was minced using a sterile surgical blade, placed on a 100-mm culture dish pretreated with 0.1% gelatin (Sigma-Aldrich), and then cultured in DMEM (Dulbecco's Modified Eagle's Medium) (Invitrogen) containing 10% FBS (fetal bovine serum) (16000-044, GIBCO, Carlsbad, Calif., USA), 10 ng/ml basic fibroblast growth factor (bFGF) and 1% penicillin/streptomycin until a sufficient amount of donor cells were obtained.

1 μg Cas9, 1 μg sgRNA and 2 μg RGS reporter plasmid DNA were premixed with $2 \times 10^6$ donor cells in 100 μl of a buffer of Amaxa™ P3 primary cell 4D Nucleofector™ X Kit L (Lonza), and then the vector system was introduced into the cells by electroporation using the program EH-113 of 4D Nucleofector™ (Lonza). After 24 hours, cells expressing fluorescence were checked with a fluorescence microscope (Leica).

As a result, it was confirmed that red fluorescence was detected in the donor cell line into which only the reporter vector was introduced, indicating that the reporter vector was introduced onto the cells. Meanwhile, both red fluorescence and green fluorescence were detected in the donor cell line into which the IGF-1 knockout CRISPR/Cas9 expression vector system constructed in Example 1-1 was introduced. Thus, it was confirmed that the vector system of the present disclosure could be introduced into the donor cell line and could operate in the donor cell line (FIG. 5).

1-3. Verification of IGF-1 Knockout CRISPR/Cas9 Expression Vector System—Flow Cytometry For production of an IGF-1 knockout transgenic cloned mini-pig, the IGF-1 knockout CRISPR/Cas9 expression vector system constructed in Example 1-1 was introduced into a normal mini-pig donor cell line for somatic cell cloning. Then, in order to confirm the introduction and operation of the vector system, flow cytometry was performed, and cells expressing red fluorescence and green fluorescence among all the cells were quantitatively analyzed.

Specifically, for flow cytometry, donor cells were transfected with red fluorescence, green fluorescence and empty vectors to make positive and negative controls, and then the wavelength band where the red fluorescence and the green fluorescence overlap was removed through a compensation process, and a setting value at which each intrinsic fluorescence is measured was obtained. Subsequently, under the set conditions, fluorescence expression was analyzed using donor cells into which the CRISPR/Cas9 vector system was introduced.

As a result, it was confirmed that red fluorescence and green fluorescence were hardly detected in the non-transgenic donor cell line, whereas red fluorescence was detected in the donor cell line into which only the reporter vector was introduced, indicating that the reporter vector was introduced into the cells. Meanwhile, in the donor cell line into which the IGF-1 knockout CRISPR/Cas9 expression vector system constructed in Example 1-1 was introduced, both red fluorescence and green fluorescence were detected. Therefore, it was confirmed that the vector system of the present disclosure could be introduced into the donor cell line and could operate in the donor cell line (FIG. 6).

tion occurred in the sgRNA-hybridizing IGF-1 nucleotide sequence by the IGF-1 knockout CRISPR/Cas9 vector system.

Specifically, cells expressing green fluorescence were sorted as single cells into a 96-well plate containing growth medium using a FACSArial III sorter (BD Biosciences). Two weeks after sorting, single colony cells selected from the 96-well plate were subcultured in a 6-well plate, and then genomic DNA was extracted from a portion of each cloned cell line using a DNeasy Blood & Tissue Kit (Qiagen). Primers were designed so that the size of a PCR product around the sgRNA of the IGF-1 gene was about 500 bp, and the gene was amplified using a PCR (Applied Biosystems) system. The amplified PCR product was electrophoresed and then recovered by gel elution. In order to examine the form of indel (nucleotide sequence changes such as mutation and insertion), the nucleotide sequence of the DNA recovered by gel elution was analyzed using the primers (Table 2) used for PCR amplification.

TABLE 2

| Primer | | Primer nucleotide sequence (5'→3') | SEQ ID NO |
|---|---|---|---|
| IGF-1 | Forward | TTCAGGGTTCCACAAGGTTC | SEQ ID NO: 3 |
| | Reverse | ATCTCTGAGGCTGAGGACGA | SEQ ID NO: 4 |

As a result, as shown in Table 3 below and FIG. 7, it was confirmed that a mutation occurred in a nucleotide sequence corresponding to the sgRNA-hybridizing IGF-1 nucleotide sequence in #3, #7, #15, #18 and #21 among the donor cell lines.

TABLE 3

| | Nucleotide sequence (5'→3') | SEQ ID NO |
|---|---|---|
| sgRNA-hybridizing IGF-1 sequence | CCACGGCTGGACCTGAGACCCTC | SEQ ID NO: 2 |
| #3 IGF-1 sequence | CCACTGGACCTGAGACCCTC | SEQ ID NO: 5 |
| #7 IGF-1 sequence | CCACGGCCTGGACCTGAGACCCTC | SEQ ID NO: 6 |
| #15 IGF-1 sequence | CCACGGCTCTGGACCTGAGACCCTC | SEQ ID NO: 7 |
| #18 IGF-1 sequence | CCACGGTGGACCTGAGACCCTC | SEQ ID NO: 8 |
| #21 IGF-1 sequence | CCACGGCTGCTGGACCTGAGACCCTC | SEQ ID NO: 9 |

Example 2. Construction of IGF-1 Mutation Transgenic Donor Cell Line

2-1. Verification of IGF-1 Knockout Transgenic Donor Cell Line—Nucleotide Sequencing The IGF-1 knockout CRISPR/Cas9 vector system was introduced into a normal mini-pig donor cell line for somatic cell cloning, and then the transgenic mini-pig donor cell line was cultured as single cells and subjected to nucleotide sequencing. Analysis was performed as to whether a muta-

2-2. Verification of IGF-1 Knockout Transgenic Donor Cell Line—Amino Acid Sequence Analysis In order to confirm how the nucleotide sequence mutation in the sgRNA-hybridizing IGF-1 nucleotide sequence, identified in Example 2-1, affects the structure of the IGF-1 protein, the amino acid sequence encoded by the mutant IGF-1 encoding sequence in the transgenic donor cell line was analyzed.

Figure 9:
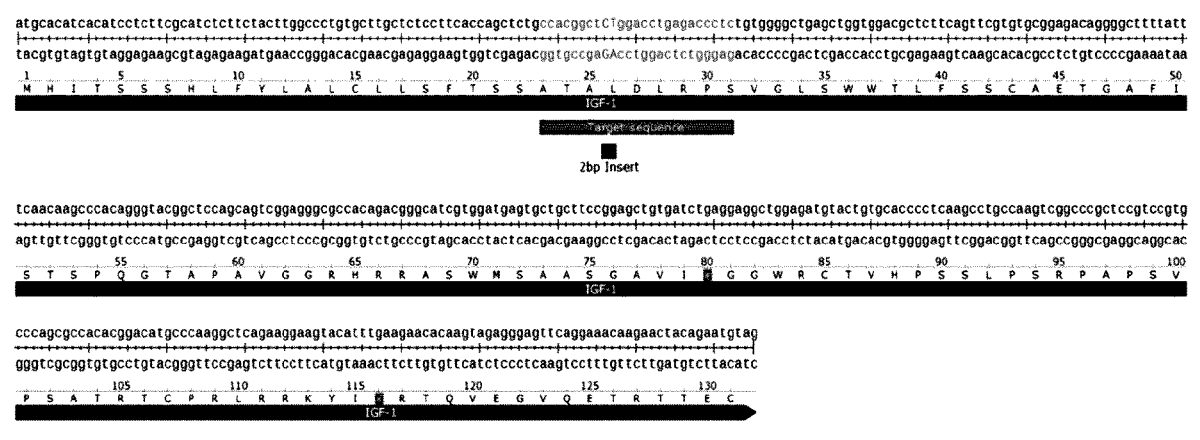

As a result, it was confirmed that, in transgenic donor cell lines #7 (+1 bp) (FIG. 8) and #15 (+2 bp) (FIG. 9) in which the sgRNA-hybridizing IGF-1 nucleotide sequence was mutated, the amino acid codon encoding IGF-1 was changed by nucleotide sequence insertion, and a premature stop codon was created. The step codon is marked in red in FIGS. 8 and 9.

2-3. Karyotyping of IGF-1 Mutation Transgenic Donor Cell Line

In order to confirm whether the nucleotide sequence mutation in the sgRNA-hybridizing IGF-1 nucleotide sequence, identified in Example 2-1, affects the autosomal and sex chromosomes of the transgenic mini-pig donor cell line, the chromosomal karyotype of the transgenic donor cell line was analyzed through the G-banding karyotyping method and the stability of the chromosome was examined.

Specifically, when the cells reached a confluency of 70 to 80%, the cells were treated with 0.1 mg/ml colcemid (Sigma-Aldrich) in a 5% $CO_2$ incubator at 37° C. for 50 minutes to stop cell division in metaphase. The cells whose division was stopped were expanded by treatment with a low osmotic solution of 0.06 M KCl (Sigma-Aldrich) at 20° C. for 10 minutes, and fixed in a fixative of methanol/acetic acid (3:1) for 30 minutes, and then centrifuged at 150 g for 10 minutes. After the fixing procedure was repeated 3 times, the fixed cells were dropped onto a glass slide and air-dried overnight at 65° C. Finally, the cells were pretreated with 0.25% trypsin, and then the chromosomes were stained by Giemsa staining and karyotyped.

As a result, it was confirmed that the autosomal and sex chromosomes of transgenic donor cell lines #7 (FIG. 10) and #15 (FIG. 11) in which the sgRNA-hybridizing IGF-1 nucleotide sequence was mutated showed a normal chromosomal pattern, indicating that the transgenic mini-pig donor cell line retained a normal diploid karyotype.

Example 3. Production of IGF-1 Knockout Transgenic Cloned Mini-Pig

Among the IGF-1 knockout transgenic donor cell lines constructed in Example 2, donor cell line #15 confirmed to have a better embryo development rate when performing somatic cell nuclear transfer (SCNT) using embryos was used to produce an IGF-1 knockout transgenic cloned mini-pig.

FIG. 12 is a schematic diagram showing a process of producing IGF-1 knockout transgenic mini-pigs by somatic cell cloning and transfer into a surrogate pig.

First, a somatic cell nucleus of IGF-1 knockout transgenic donor cell line #15 was transferred into an enucleated oocyte.

Specifically, after in vitro maturation (IVM), matured oocytes with a visible first polar body were selected for SCNT.

Using an automated inverted microscope (DMI 6000B, Leica) equipped with a micromanipulator (NT-88-V3, Nikon-Narishige), denuded oocytes were placed in DPBS containing 4 mg/mL BSA, 75 μg/mL penicillin G, 50 μg/mL streptomycin sulfate, and 7.5 μg/mL CB, and then penetrated by cutting the pipette to make a slit to squeeze approximately 10% of the cytoplasm and the first polar body out of the oocytes. The donor cells were cultured for 3 days without changing the medium so as to be synchronized in the G0/G1 phage of the cell cycle, and the oocytes were maintained in IVC medium in an incubator with 5% $CO_2$ at 38.5° C. until electrical fusion. The single donor cell/oocyte was equilibrated in a fusion medium consisting of 280 mM mannitol (Sigma-Aldrich) containing 0.1 mM $MgSO_4·7H_2O$ and 0.01% PVA, and placed between two parallel electrodes (100 μm in diameter; CUY 5100-100; Nepa Gene) attached to the micromanipulator. The oocytes were activated by a single direct current pulse of 23 V for 50 μsec using an Electro Cell Fusion Generator, and then placed in an incubator with 5% $CO_2$ at 38.5° C. After 2 hours, the completely fused oocytes were selected under a phase-contrast microscope, transferred to a 1-mm gap wire chamber overlaid with 10 μL of 280 mM mannitol solution containing 0.1 mM $MgSO_4·7H_2O$, 0.1 mM $CaCl_2·2H_2O$, 0.5 mM HEPES, and 0.01% PVA, and then activated with 110 V DC for 50 μsec using an Electro Cell Fusion Generator. In order to chemically activate the oocytes activated by electrical fusion, the oocytes were added to a medium containing 50 nM trichostatin A (TSA) and maintained in an incubator with 5% $CO_2$ at 38.5° C. for 4 hours. After 4 hours, the activated embryos were transferred to an IVC medium supplemented with 50 nM TSA and further cultured for 20 hours. After 20 hours, the SCNT embryos were washed in IVC medium, and placed in an incubator with 5% $CO_2$ at 38.5° C. Thereafter, division and blastocyst formation were evaluated on days 2 and 6, respectively, and transfer into a surrogate pig was prepared.

Thereafter, the oocytes into which the somatic cell nucleus of IGF-1 knockout transgenic donor cell line #15 was transferred were transferred into surrogate pigs.

Specifically, the fused cloned embryos were cultured for 1 to 2 days in a 4-well plate containing 500 μl of culture medium, and then placed in a freezing tube containing 2 ml of the same culture medium and transferred to an embryo transfer place by an embryo transfer kit (Minitube, USA) warmed to 39° C. Surrogate pigs for transfer of cloned embryos were prepared by selecting animals whose estrus started. The surrogate pigs were washed and temporarily anesthetized by administering 0.5 g of pentothal sodium (JW Pharmaceutical Co., Ltd.) to the ear vein. Each of the anesthetized surrogate pigs was fixed to an operating table, and then subjected to inhalation anesthesia with 5% isoflurane. The anesthetized surrogate pig was prepared by incising the abdominal wall along the midline by about 5 cm and then exposing the uterus and ovaries to the outside. At this time, the cloned embryos were transferred by aspirating them into a catheter (Tom cat catheter, Monoject, USA) and pushing them to the isthmus of the fallopian tube. A total of 600 cloned embryos were transferred into two surrogate pigs for the production of IGF-1 knockout transgenic cloned pigs. After completion of cloned embryo transfer, the surrogate pigs were subjected to a pregnancy test using ultrasound on day 30. The surrogate pigs confirmed to be pregnant were induced to deliver after 114 days.

The surrogate pigs were bred in SPF (Special Pathogen-Free) facilities while the movement of the mini-pigs was eased using a flooring material made of plastic in consideration of the characteristics of the mini-pigs. In addition, a temperature-keeping pad was provided on the bottom of the breeding cage to help maintain mini-piglets at a constant temperature. IGF-1 knockout transgenic cloned mini-pigs were subjected to artificial suckling with feed containing 70 g safe milk, 1 g colostrum stick and 1 g vitamin in 500 ml water at 2-hour intervals from 2 days after delivery, and were subjected to iron injection twice. After birth of the mini-pigs, the individual weight and feed amount of each mini-pig were recorded for 3 months, and systematic maintenance and control of the bred IGF-1 knockout mini-pigs was performed through microbial monitoring.

As shown in FIG. 13, it was confirmed that, on 35 days after transfer into the surrogate pig, one IGF-1 knockout fetus was aborted, and on 2 days after birth, one IGF-1 knockout piglet was crushed to death by the surrogate pig, and the area crushed by the surrogate pig was a portion indicated by the yellow circle in FIG. 13.

Meanwhile, other IGF-1 knockout piglets survived, and FIG. 14 depicts photographs comparing a 56-day-old IGF-1 knockout mini-pig with a 56-day-old normal mini-pig.

Example 4. Confirmation of IGF-1 Knockout in Transgenic Cloned Mini-Pig 4-1. Nucleotide Sequencing of IGF-1 Knockout Transgenic Cloned Mini-Pig In order to confirm whether the produced cloned mini-pig is an IGF-1 knockout transgenic mini-pig, the nucleotide sequence of the IGF-1 knockout transgenic cloned mini-pig was analyzed.

Specifically, nucleotide sequencing was performed in the same manner as in Example 2-1, except that cells derived from aborted, died and alive IGF-1 knockout transgenic cloned mini-pigs and IGF-1 knockout transgenic donor cell line #15 were used.

As a result, as can be seen in FIG. 15, it was confirmed that the gRNA-hybridizing IGF-1 nucleotide sequence in all the aborted, died and alive IGF-1 knockout transgenic cloned mini-pigs was the same as the nucleotide sequence of transgenic donor cell line #15, indicating that the produced cloned mini-pigs were IGF-1 knockout transgenic cloned mini-pigs.

4-2. Verification of Off-Target in IGF-1 Knockout Transgenic Cloned Mini-Pig

In order to examine whether the IGF-1 knockout CRISPR/Cas9 expression vector system constructed in Example 1-1 targeted nucleotide sequences other than the IGF-1 target sequence, off-target in the IGF-1 knockout transgenic cloned mini-pig was verified.

Specifically, nucleotide sequencing of genes comprising sequences (Table 4 below) similar to the IGF-1 target sequence (a sequence complementary to the sgRNA-hybridizing IGF-1 nucleotide sequence) was performed in the same manner as in Example 2-1, except that cells derived from the IGF-1 knockout transgenic cloned mini-pig crushed to death were used.

TABLE 4

| Gene name | Target sequence (5'→3') | SEQ ID NO |
|---|---|---|
| IGF-1 | GAGGGTCTCAGGTCCAGCCG | SEQ ID NO: 10 |
| SCL25A36 | GATGGTCTGAGGTGCAGCCG | SEQ ID NO: 11 |
| CACNA1E | GAAGGACTCAGGTCCAGCTG | SEQ ID NO: 12 |
| DNAH8 | GTGGGTCTCAGGACCAGCTG | SEQ ID NO: 13 |
| TRPV3 | GAGAGTCTCAGGTCCACCCC | SEQ ID NO: 14 |
| PRDM11 | GCGGGGCTCAGGTCCTGCCG | SEQ ID NO: 15 |
| U6 | CAGGGTCTCAGGGCCCAGCTG | SEQ ID NO: 16 |
| PRKCZ | GAGGGGCTCAGGACCAGCCC | SEQ ID NO: 17 |

As a result, as can be seen in FIGS. 16 and 17, it was confirmed that no mutation occurred in the nucleotide sequences similar to the IGF-1 target sequence, except the IGF-1 target sequence, and the off-target problem did not occur.

4-3. Analysis of mRNA Expression Level in IGF-1 Knockout Transgenic Cloned Mini-Pig IGF-1 and IGF-2 are regulated by proteins known as IGFBP. These proteins not only promote potential IGF activity by helping delivery to the receptor and increasing the IGF half-life, but also inhibit IGF action by preventing binding to the IGF-1 receptor. That is, these proteins help regulate IGF activity in a complex way, including all those mentioned above.

Thus, in order to examine the expression of IGF-1, IGF-2, IGFBP1, IGFBP2 and IGFBP3, mRNA was extracted from the liver tissue of each of a normal mini-pig and the IGF-1 knockout mini-pig crushed to death by the surrogate pig and synthesized into cDNA, and then the expression of these genes was analyzed using the probes shown in Table 4.

Specifically, total RNA was extracted from cells and tissue using an RNeasy plus mini kit (QIAGEN) according to the method provided by the manufacturer. Total RNA (1 μg) was synthesized into cDNA using a PrimeScript RT reagent kit (TAKARA), and the relative expression levels of the genes were measured by real-time RT-PCR using a SYBR Premix Ex Taq II (TAKARA), and analyzed by a StepOnePlus Real-Time PCR System (Applied Biosystems). The reaction for quantitative RT-PCR analysis was performed under the following conditions: initial denaturation at 95° C. for 10 min, and then 40 cycles, each consisting of 95° C. for 30 sec, 62° C. for 30 sec, and 72° C. for 30 sec, followed by final extension at 72° C. for 5 min. For comparative analysis, the mRNA expression level of each gene was normalized by GAPDH and then expressed as fold-change. WT was used as a control ΔCt (CΔCt) value, and a sample delta Ct (SΔCt) value was calculated from the difference between GAPDH and the Ct value of the target gene. The relative gene expression level between the sample and the control was determined using the equation 2-(SΔCt-CΔCt). PCR primers for the amplification of porcine cDNA were designed as shown in Table 5 below using Primer3 software.

TABLE 5

| Primer | | Product nucleotide sequence (5'→3') | SEQ ID NO | Accession No. | Primer size (bp) |
|---|---|---|---|---|---|
| IGF-1 | Forward | CGGAGACAGGGGCTTTTAT T | SEQ ID NO: 18 | NM_214256.1 | 121 |
| | Reverse | CTCCAGCCTCCTCAGATCA C | SEQ ID NO: 19 | | |
| IGF-2 | Forward | GGAAGAGTGCTGCTTCCGT A | SEQ ID NO: 20 | NM_213883.2 | 127 |
| | Reverse | GGGGTATCTGGGGAAGTTG T | SEQ ID NO: 21 | | |

TABLE 5-continued

| Primer | | Product nucleotide sequence (5'→3') | SEQ ID NO | Accession No. | Primer size (bp) |
|---|---|---|---|---|---|
| IGFBP-1 | Forward | CGACATCAAGAAGTGGAAGGA | SEQ ID NO: 22 | NM_001195105.1 | 123 |
| | Reverse | TTGTTGCAGTTCGGCAGATA | SEQ ID NO: 23 | | |
| IGFBP-2 | Forward | GGATGGGAACGTGAACTTGT | SEQ ID NO: 24 | NM_214003.1 | 109 |
| | Reverse | GTGCTGCTCCGTGACTTTCT | SEQ ID NO: 25 | | |
| IGFBP-3 | Forward | GACACGCTGAACCACCTCA | SEQ ID NO: 26 | NM_001005156.1 | 151 |
| | Reverse | CGTACTTATCCACGCACCAG | SEQ ID NO: 27 | | |
| GAPDH | Forward | CCCTGAGACACGATGGTGAA | SEQ ID NO: 28 | NM_001206359.1 | 127 |
| | Reverse | GGAGGTCAATGAAGGGGTCA | SEQ ID NO: 29 | | |

As a result, it was confirmed that, in the IGF-1 knockout transgenic cloned mini-pig, IGF-1 expression was hardly observed, IGF-2 expression increased in a compensatory manner by the deficient IGF-1 gene, and the expression of IGFBP1 (IGF binding protein 1), which has the opposite function of IGF-1, increased to a significant level (FIG. 18).

4-4. Analysis of Hematological Level of Hormone in IGF-1 Knockout Transgenic Cloned Mini-Pig It is known that IGF-1 inhibits growth hormone (GH) by negative feedback, and insulin (INS) shares a receptor with IGF-1, and thus increases to compensate for the function of IGF-1 in the absence of IGF-1.

Therefore, in order to examine the expression of IGF-1, the levels of changes in these hormones were analyzed by performing ELISA analysis on the blood of a normal mini-pig and an alive IGF-1 knockout mini-pig.

Specifically, an experiment was performed using a Porcine IGF-1 ELISA Kit (Cat. MBS761388), Porcine Growth Hormone ELISA Kit (Cat. MBS026403) and Porcine Insulin (INS) ELISA Kit (Cat. MBS2601735), each being commercially available from MyBioSource, according to the manufacturer's instructions, and the result values were collected.

As a result, it was confirmed that, in the IGF-1 knockout transgenic cloned mini-pig, the expression of IGF-1 was hardly observed, and INS increased in a compensatory manner due to the deficiency of IGF-1, and the level of GH significantly increased (FIG. 19).

Example 5. Confirmation of IGF-1 Knockout Phenotypes in Transgenic Cloned Mini-Pig 5-1. Confirmation of Low Weight at Birth In order to confirm whether the IGF-1 knockout transgenic cloned mini-pig exhibits IGF-1 knockout phenotypes, whether the IGF-1 knockout mini-pig had a normal body weight at birth was checked.

Specifically, the body weights of the IGF-1 knockout mini-pig and normal mini-pigs were compared during a period ranging from birth to 27 days after birth.

As a result, it was confirmed that the body weights at birth of the mini-pigs were 835±91 g on average for the normal pigs, but 400 g for the alive IGF-1 knockout mini-pig, and 273 g for the IGF-1 knockout mini-pig crushed to death. In addition, the body weights 27 days after birth were 4,608±256 g on average for the normal pigs, but 892 g for the alive IGF-1 knockout mini-pig (FIG. 19).

From these results, it was confirmed that the difference in body weight of the IGF-1 knockout transgenic cloned mini-pig at birth occurred, and the weight gain thereof during growth significantly decreased unlike the normal mini-pigs, indicating that the IGF-1 knockout transgenic cloned mini-pig exhibited IGF-1 knockout phenotypes.

5-2. Confirmation of Small Size at Birth and Small Height after Birth

In order to confirm whether the IGF-1 knockout transgenic cloned mini-pig exhibits IGF-1 knockout phenotypes, whether the IGF-1 knockout mini-pig had a small size at birth and a small height after birth was checked.

Specifically, the sizes of the IGF-1 knockout mini-pig and the normal mini-pigs at birth were compared, and the sizes of the 3-month-old IGF-1 knockout mini-pig and the 3-month-old normal mini-pigs were compared.

As a result, it was confirmed that, compared to the normal mini-pigs, the IGF-1 knockout mini-pig crushed to death had a smaller size at birth (FIG. 20), and the alive IGF-1 knockout mini-pigs had a clear difference in development around 20 days after birth (FIG. 21). In addition, it was confirmed that, compared to the 3-month-old normal mini-pig, the alive 3-month-old IGF-1 knockout mini-pig had a smaller body length and height (FIG. 22).

From these results, it was confirmed that the IGF-1 knockout transgenic cloned mini-pig had a difference in size at birth, and the increase in body height thereof during growth was significantly smaller than that of the normal mini-pigs, indicating that the IGF-1 knockout transgenic cloned mini-pig exhibited IGF-1 knockout phenotypes.

5-3. Confirmation of Truncal Obesity

In order to confirm whether the IGF-1 knockout transgenic cloned mini-pig exhibits IGF-1 knockout phenotypes, whether the IGF-1 knockout mini-pig had truncal obesity was checked.

Specifically, the truncal width of the trunk (forelimb scapula/hind limb pelvic bone baseline) was compared between the 3-month-old IGF-1 knockout mini-pig and the 3-month-old normal mini-pig.

As a result, it was confirmed that the 3-month-old IGF-knockout mini-pig had truncal obesity (FIG. 23). In addition, the abdominal girth of the IGF-1 knockout mini-pig was measured, and the measured abdominal girth was corrected based on the abdominal girth (100%) of the normal mini-pig using the body length and height thereof and compared to that of the normal mini-pig. As a result, it was confirmed that the abdominal girth of the IGF-1 knockout mini-pig was 216% of that of the normal mini-pig (FIG. 24).

From these results, it was confirmed that the IGF-1 knockout transgenic cloned mini-pig had significant truncal obesity, unlike the normal mini-pig, indicating that the IGF-1 knockout transgenic cloned mini-pig exhibits IGF-1 knockout phenotypes.

5-4. Confirmation of Prominent Forehead, Unclosed Cranial Suture, Short Nose Length, Small Cranium, and Insufficient Teeth In order to confirm whether the IGF-1 knockout transgenic cloned mini-pig exhibits IGF-1 knockout phenotypes, whether the IGF-1 knockout transgenic cloned mini-pig had a prominent forehead, unclosed cranial suture, a short nose length, a small cranium and insufficient teeth was checked.

Specifically, cranial computed tomography (CT) was performed on a 3-month-old IGF-1 knockout mini-pig and normal mini-pig, and the CT images were compared.

As a result, it was confirmed that the IGF-1 knockout mini-pig had a prominent forehead form and the normal mini-pig had a flat forehead form. As can be seen in FIG. 25, it was confirmed that, unlike the normal mini-pig whose cranium has been closed from birth, the alive IGF-1 knockout mini-pig showed unclosed cranial suture (arrow), and the alive IGF-1 knockout mini-pig had a relatively short nose length (human saddle nose phenotype), a small cranial size, and a relatively small number of teeth (upper, lower front molars underdeveloped), compared to the normal mini-pig (FIG. 25).

In addition, as can be seen in FIG. 26, it was confirmed that, when the cranium was anatomically exposed, the sutures in the GF-1 KO mini-pigs (#002 and #003) were not closed (red arrow), and the craniums of the GF-1 KO mini-pigs protruded compared to those of WT mini-pigs (#031 and #032).

In addition, the head circumference of the IGF-1 knockout mini-pig was measured, and the measured head circumference was corrected based on the head circumference (100%) of the normal mini-pig using the horizontal and vertical circumferences thereof and compared to that of the normal mini-pig. As a result, the head circumference of the IGF-1 knockout mini-pig was 58% of the normal mini-pig (FIG. 27).

From these results, it was confirmed that the IGF-1 knockout transgenic cloned mini-pig had a prominent forehead, unclosed cranial suture, a short nose length, a small cranium and insufficient teeth, unlike the normal mini-pigs, indicating that it exhibits IGF-1 knockout phenotypes.

5-5. Confirmation of Insufficient Hair

In order to confirm whether the IGF-1 knockout transgenic cloned mini-pig exhibits IGF-1 knockout phenotypes, whether the IGF-1 knockout transgenic cloned mini-pig had insufficient hair was checked.

Specifically, occipital hair was compared between a 3-month-old IGF-1 knockout transgenic cloned mini-pig and a 3-month-old normal mini-pig.

As a result, it was confirmed that the alive IGF-1 knockout mini-pig had a remarkably insufficient number of hairs and poor hair conditions (FIG. 28), indicating that the IGF-1 knockout transgenic cloned mini-pig exhibits IGF-1 knockout phenotypes.

5-6. Confirmation of Short-Limbed Dwarfism, Undescended Testis and Small Genital In order to confirm whether the IGF-1 knockout transgenic cloned mini-pig exhibits IGF-1 knockout phenotypes, whether the IGF-1 knockout transgenic cloned mini-pig had short-limbed dwarfism and a small genital was checked.

Specifically, the forelimb ankle thickness and the testis size were compared between a 20-day-old or 3-month-old IGF-1 knockout mini-pig and normal mini-pig.

As a result, it was confirmed that the forelimb ankle thickness of the 3-month-old normal mini-pig was 42.75 cm, whereas the forelimb ankle thickness of the alive IGF-1 knockout mini-pig was 27.16 cm (FIG. 29).

In addition, it was confirmed that an undescended testicle (intraperitoneal testis) was observed in the 20-day-old IGF-1 knockout mini-pig (FIG. 30), and the testicle size of the 3-month-old normal mini-pig was 42.75 cm, whereas the testicle size of the alive IGF-1 knockout mini-pig was 27.16 cm (FIG. 31).

From these results, it was confirmed that the IGF-1 knockout transgenic cloned mini-pig had short-limbed dwarfism and was expected to have delayed maturation due to delayed testicle development, unlike the normal mini-pigs, indicating that the IGF-1 knockout transgenic cloned mini-pig exhibits IGF-1 knockout phenotypes.

5-6. Confirmation of Small Organ Sizes and Weights

In order to confirm whether the IGF-1 knockout transgenic cloned mini-pig exhibits IGF-1 knockout phenotypes, the organ sizes and weights of the IGF-1 knockout transgenic cloned mini-pig were measured.

Specifically, the sizes and weights of heart, lung, liver, spleen, pancreas, kidney and testis were compared between 20-day-old IGF-1 knockout mini-pigs and normal mini-pigs.

As a result, it was confirmed that all organs of the 20-day-old IGF-1 knockout mini-pigs were significantly smaller than those of the 20-day-old normal mini-pigs, and the weights of all organs of the 20-day-old IGF-1 knockout mini-pigs were about 16 to 36% of those of the 20-day-old normal mini-pigs (Table 6 and FIG. 32).

TABLE 6

|  | Normal mini-pigs (N = 2) | IGF-1 knockout mini-pigs (N = 2) | Weight percentage (%) |
|---|---|---|---|
| Body weight | 3,400 ± 424.26 g | 553.50 ± 75.66 g | 16.28 |
| Heart | 21.73 ± 6.56 g | 4.68 ± 0.32 g | 21.54 |
| Lung | 40.52 ± 2.57 g | 14.72 ± 0.78 g | 36.33 |
| Liver | 110.44 ± 23.75 g | 24.66 ± 1.51 g | 22.33 |
| Spleen | 10.83 ± 2.06 g | 1.74 ± 0.20 g | 16.08 |
| Pancreases | 3.96 ± 0.63 g | 1.42 ± 0.11 g | 35.72 |
| Kidney | 19.99 ± 2.26 g | 6.74 ± 0.59 g | 33.71 |
| Testis | 6.46 ± 0.52 g | 1.70 ± 0.25 g | 26.30 |

From these results, it was confirmed that the IGF-1 knockout transgenic cloned mini-pigs had smaller organ sizes and weights than the normal mini-pigs, indicating that they exhibit IGF-1 knockout phenotypes.

Example 6. Confirmation of Change in Personality Gene Expression in Transgenic Cloned Mini-Pig Personality genes are genes associated with hyper-sociality, and it has been found that these genes are associated with personality because the expression thereof decreases in Williams-Beuren syndrome in humans. In 2010, Nature published an article that described the similarities between dogs and genomes causing Williams-Beuren syndrome. Williams-Beuren syndrome is characterized by excessive kindness to people, lack of inhibitions about strangers, and hyper-sociality, and is often accompanied by low intelligence and impaired health and appearance.

In order to confirm whether the IGF-1 knockout transgenic cloned mini-pig exhibits the characteristics of Williams-Beuren syndrome, the expression of personality genes in the IGF-1 knockout mini-pig was analyzed.

Specifically, the expression of EIF4H, CLIP2, ELN, LIMK1 and RFC2 genes, which are personality genes, was analyzed in the same manner as in Example 4-3, except that the probes shown in Table 7 below were used after mRNA was extracted from the liver tissue of each of the normal mini-pig and the IGF-1 knockout mini-pig crushed to death and synthesized into cDNA.

TABLE 7

|  | Primer | Product nucleotide sequence (5'→3') | SEQ ID NO | Accession No. | Primer size (bp) |
|---|---|---|---|---|---|
| EIF4H | Forward | ACTTCGTGTGGACATTGCAG | SEQ ID NO: 30 | NM_001243447.1 | 102 |
|  | Reverse | GATTCTCGAGAGCCACCCATT | SEQ ID NO: 31 |  |  |
| CLIP2 | Forward | GTTCCCACCAGGACAGCTAA | SEQ ID NO: 32 | XM_021086343.1 | 146 |
|  | Reverse | AGAGCTACCGAAAGCCAACA | SEQ ID NO: 33 |  |  |
| LIMK1 | Forward | CTGGGGAGCTGAAATACCAC | SEQ ID NO: 34 | XM_021086335.1 | 111 |
|  | Reverse | GCCCACAGTAGAGCTTGGAG | SEQ ID NO: 35 |  |  |
| ELN | Forward | AGCCAAATCTGCTGCTAAGG | SEQ ID NO: 36 | XM_021085777.1 | 149 |
|  | Reverse | GTACTGCACCTGCCCCAAAG | SEQ ID NO: 37 |  |  |
| RFC2 | Forward | GTTCAAGGTCTGCGACGAG | SEQ ID NO: 38 | XM_021086337.1 | 119 |
|  | Reverse | AATAGCCAAGATGCCACAGG | SEQ ID NO: 39 |  |  |

As a result, it was confirmed that the expression of most of the personality genes decreased in the IGF-1 knockout mini-pig compared to the normal mini-pig (FIG. 33).

From these results, it was confirmed that the IGF-1 knockout transgenic cloned mini-pig exhibited the characteristics of Williams-Beuren syndrome, unlike the normal mini-pigs.

So far, the present disclosure has been described with reference to the embodiments thereof. Those of ordinary skill in the art to which the present disclosure pertains will appreciate that the present disclosure may be embodied in modified forms without departing from the essential characteristics of the present disclosure. Therefore, the disclosed embodiments should be considered from an illustrative point of view, not from a restrictive point of view. The scope of the present disclosure is defined by the claims rather than the foregoing description, and all differences within the scope equivalent thereto should be construed as being included in the present disclosure.

The invention claimed is:

1. A mini pig dwarfism model whose genome comprises a knockout mutation in an endogenous porcine IGF-1 gene, wherein the knockout mutation comprises insertion of the nucleotide sequence as set forth in SEQ ID NO. 6 or 7 into the endogenous IGF-1 gene; wherein the mini-pig is a model of Laron syndrome or Williams-Beuren syndrome; and wherein the weights of all the organs of the mini pig are about 16% to 36% of those of a normal mini pig of the same age.

2. The mini pig dwarfism model of claim 1, wherein the endogenous IGF-1 knockout mutation results in decreased expression of any one or more genes selected from the group consisting of EIF4H, CLIP2, ELN, LIMK1, and RFC2.

* * * * *